(12) United States Patent
Yao et al.

(10) Patent No.: US 11,347,030 B2
(45) Date of Patent: May 31, 2022

(54) IMAGING LENS SYSTEM

(71) Applicant: Apple Inc., Cupertino, CA (US)

(72) Inventors: Yuhong Yao, San Jose, CA (US);
Yoshikazu Shinohara, Cupertino, CA (US); Lin-Yao Liao, Yokohama (JP)

(73) Assignee: Apple Inc., Cupertino, CA (US)

( * ) Notice: Subject to any disclaimer, the term of this patent is extended or adjusted under 35 U.S.C. 154(b) by 263 days.

(21) Appl. No.: 15/979,776

(22) Filed: May 15, 2018

(65) Prior Publication Data

US 2018/0364457 A1 Dec. 20, 2018

Related U.S. Application Data

(60) Provisional application No. 62/522,594, filed on Jun. 20, 2017.

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC .............................. G02B 13/0045; G02B 9/64
USPC .................................................. 359/754, 755
See application file for complete search history.

(56) References Cited

U.S. PATENT DOCUMENTS

| | | | |
|---|---|---|---|
| 5,796,529 A | 8/1998 | Park | |
| 8,599,495 B1 * | 12/2013 | Tsai | G02B 13/18 359/708 |
| 9,507,125 B2 | 11/2016 | Hashimoto | |
| 9,632,287 B2 | 4/2017 | Chae | |
| 10,168,509 B2 | 1/2019 | Teraoka | |

(Continued)

FOREIGN PATENT DOCUMENTS

| | | |
|---|---|---|
| CN | 105301746 | 2/2016 |
| JP | 2006072188 | 3/2006 |

(Continued)

OTHER PUBLICATIONS

Office Action from Taiwan Application No. 107119756, (English Translation and Taiwan Version), dated Feb. 13, 2019, (Apple Inc.), pp. 1-10.

(Continued)

*Primary Examiner* — Ephrem Z Mebrahtu
(74) *Attorney, Agent, or Firm* — Robert C. Kowert; Kowert, Hood, Munyon, Rankin & Goetzel, P.C.

(57) ABSTRACT

Compact lens systems are described that may be used in small form factor cameras. The lens systems may include seven lens elements with refractive power, and may provide low F-numbers with wide field of view while maintaining or improving imaging quality and package size when compared to other compact lens systems. The lens systems may, for example, provide a focal ratio of 1.85 or less, with full field of view of 75 degrees or more. The lens systems may conform to a criterion for compactness TTL/ImageH<1.7, where TTL is the total track length of the lens system, and ImageH is the semi-diagonal image height of the image plane at the photosensor. Lens system parameters and relationships may be selected at least in part to reduce, compensate, or correct for optical aberrations and lens artifacts and effects across the field of view.

18 Claims, 26 Drawing Sheets

(56) References Cited

U.S. PATENT DOCUMENTS

| | | | |
|---|---|---|---|
| 2014/0009843 A1* | 1/2014 | Tsai | G02B 9/64 359/708 |
| 2015/0268448 A1* | 9/2015 | Kubota | G02B 13/0045 359/755 |
| 2015/0378131 A1 | 12/2015 | Tang et al. | |
| 2016/0033742 A1* | 2/2016 | Huang | G02B 9/64 359/708 |
| 2016/0033743 A1* | 2/2016 | Chen | G02B 27/0025 359/708 |
| 2016/0124191 A1* | 5/2016 | Hashimoto | G02B 13/0045 359/708 |
| 2016/0131874 A1 | 5/2016 | Tang et al. | |
| 2016/0252710 A1 | 9/2016 | Lee et al. | |
| 2016/0341937 A1 | 11/2016 | Tsai et al. | |
| 2017/0003482 A1* | 1/2017 | Chen | H04N 5/225 |
| 2017/0129798 A1* | 5/2017 | Steinwandel | C03B 23/13 |
| 2017/0199351 A1 | 7/2017 | Teraoka | |
| 2017/0199352 A1 | 7/2017 | Teraoka | |
| 2017/0199353 A1 | 7/2017 | Teraoka | |
| 2017/0219798 A1* | 8/2017 | Park | G02B 13/0045 |
| 2017/0235109 A1* | 8/2017 | Shin | G02B 9/34 359/708 |
| 2018/0164544 A1* | 6/2018 | Kwak | G02B 9/60 |
| 2018/0188488 A1* | 7/2018 | Gong | G02B 13/0045 |
| 2018/0364454 A1* | 12/2018 | Yang | G02B 9/64 |
| 2019/0049700 A1* | 2/2019 | Kunimatsu | G02B 27/0025 |
| 2019/0121066 A1* | 4/2019 | Yan | G02B 9/64 |
| 2019/0121078 A1* | 4/2019 | Yan | G02B 13/0045 |
| 2019/0121082 A1* | 4/2019 | Shi | G02B 13/0045 |
| 2020/0257085 A1* | 8/2020 | Yang | G02B 9/64 |

FOREIGN PATENT DOCUMENTS

| | | |
|---|---|---|
| JP | 5890948 | 7/2017 |
| TW | 201403166 | 1/2014 |
| TW | 201407187 | 2/2014 |
| TW | 201537209 | 10/2015 |
| TW | 201638624 | 11/2016 |
| TW | M542775 | 6/2017 |

OTHER PUBLICATIONS

International Search Report and Written Opinion form PCT/US2018/035152, dated Oct. 17, 2018, Apple Inc., pp. 1-13.

Office action from Chinese Application No. 2019-568256, dated Jan. 4, 2021, (English translation and Chinese version), pp. 1-11.

Office action from Chinese Application No. 201880039372.1, dated Mar. 22, 2021, (English translation and Chinese version), pp. 1-26.

* cited by examiner

IMAGING LENS SYSTEM

PRIORITY INFORMATION

This application claims benefit of priority of U.S. Provisional Application Ser. No. 62/522,594 entitled "IMAGING LENS SYSTEM" filed Jun. 20, 2017, the content of which is incorporated by reference herein in its entirety.

BACKGROUND

Technical Field

This disclosure relates generally to camera systems, and more specifically to high-resolution, small form factor camera and lens systems.

Description of the Related Art

The advent of small, mobile multipurpose devices such as smartphones and tablet or pad devices has resulted in a need for high-resolution, small form factor cameras that are lightweight, compact, and capable of capturing high resolution, high quality images at low F-numbers for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens systems with improved imaging quality performance has increased. In addition, there are increasing expectations for small form factor cameras to be equipped with higher pixel count and/or larger pixel size image sensors (one or both of which may require larger image sensors) while still maintaining a module height that is compact enough to fit into portable electronic devices. Thus, a challenge from an optical system design point of view is to provide an imaging lens system that is capable of capturing high brightness, high resolution images under the physical constraints imposed by small form factor cameras.

SUMMARY OF EMBODIMENTS

Embodiments of the present disclosure may provide a compact imaging lens system including seven lens elements that may be used in a camera and that provide a low F-number (<=2.1), wide field of view (e.g., 75 degrees or greater) and short total track length (e.g., 6.8 mm or less) that allow the camera to be implemented in a small package size while still capturing sharp, high-resolution images, making embodiments of the camera suitable for use in small and/or mobile multipurpose devices. Embodiments of the lens system include seven lens elements with refractive power arranged along an optical axis from a first lens element on the object side to a seventh lens on the image side. In embodiments, the first lens element has positive refractive power, the third lens element has negative refractive power, the fourth lens element has positive refractive power, and the sixth lens element has positive refractive power. The second, fifth, and seventh lens elements may have either positive or negative refractive power in various embodiments. Lens system parameters and relationships including but not limited to power distribution, lens shape, thickness, aperture location, geometry, position, materials, spacing, and the surface shapes of certain lens elements may be selected at least in part to reduce, compensate, or correct for optical aberrations and lens artifacts and effects across the field of view.

In some embodiments, the lens system may include an aperture stop located between the object side of the optical system and the third lens element for controlling the brightness of the optical system. In some embodiments, the aperture stop may be located at the first lens element at or behind the front vertex of the lens system. In some embodiments, the aperture stop may instead be located between the first and second lens elements. In some embodiments, the lens system may also include one or more internal or secondary stops, for example a secondary stop located at the object side surface of the fourth lens element, or two secondary stops, with one located at the image side surface of the second lens element and one located at the image side surface of the fourth lens element. The secondary stop(s) may, for example, help in aberration control in low F-number and wide FOV conditions by cutting off a percentage of the off-axis ray bundles. In some embodiments, the lens system may also include an infrared (IR) filter to reduce or eliminate interference of environmental noise on the photosensor. The IR filter may, for example, be located between the seventh lens element and the photosensor.

In some embodiments, the lens system may satisfy one or more of the following relationships:

$$0.6 < (f_{system}/f12) < 1.4$$

$$0.55 < |f_{system}/f3| + |f_{system}/f5| < 1.15$$

$$(R9+R10)/(R9-R10) < -2$$

$$0.8 < (Vd1+Vd3)/Vd2 < 3$$

$$Vd6 < 45$$

where $f_{system}$ is the effective focal length of the lens system, f12 is the composite focal length of the first and second lens elements, f3 is effective focal length of the third lens element, f5 is effective focal length of the fifth lens element, R9 is radius of curvature of the object side surface of the fifth lens element, R10 is radius of curvature of the image side surface of the fifth lens element, and Vd1, Vd2, Vd3, and Vd6 are the Abbe numbers of the first, second, third, and sixth lens elements, respectively.

In some embodiments, the lens system may satisfy a criterion for compactness as defined in the following relationship:

$$TTL/ImageH < 1.7$$

where TTL is the total track length of the lens system when focused at infinity, and where ImageH is the semi-diagonal image height on the image plane at the photosensor.

Figure 1A:
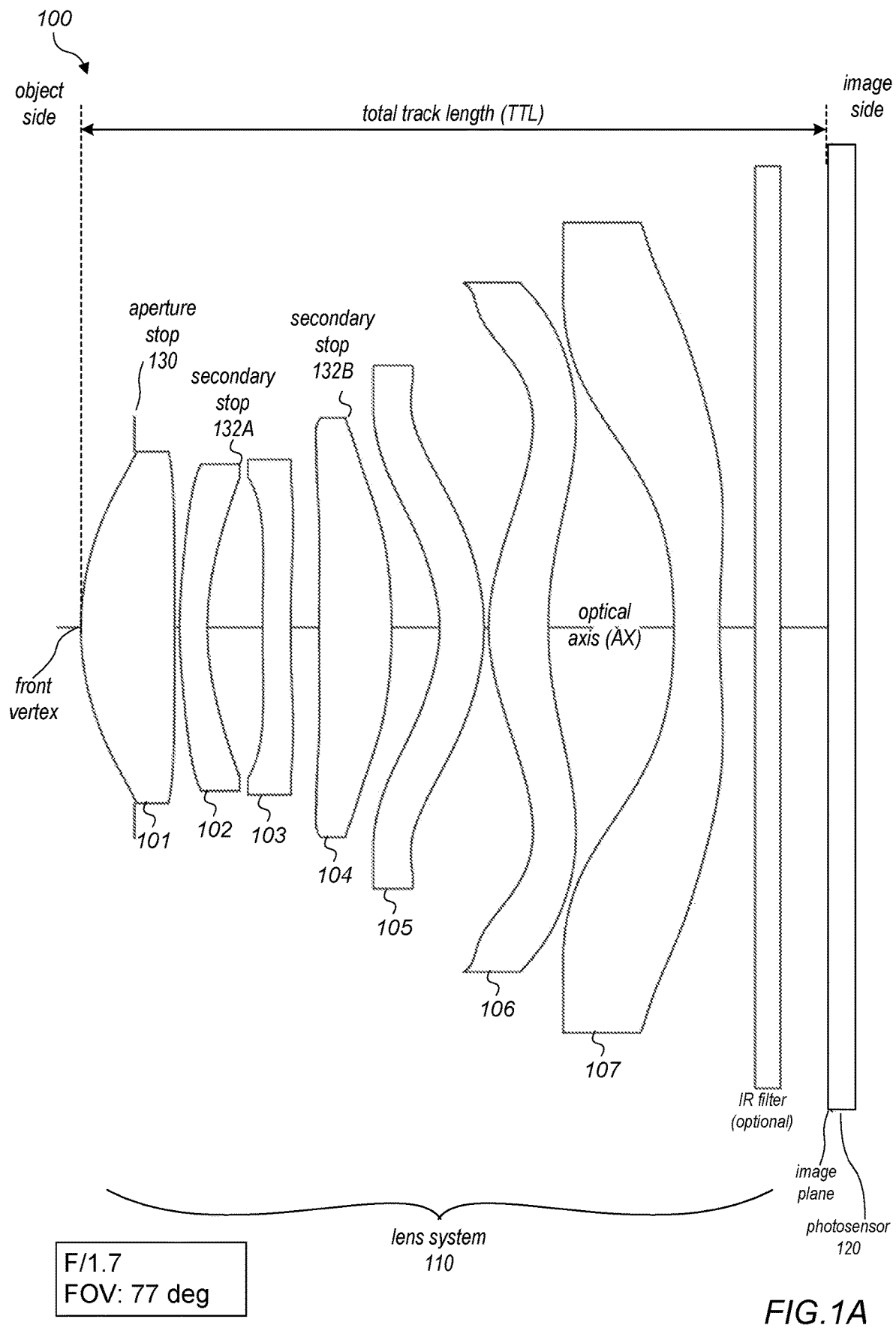
FIG. 1A is a cross-sectional illustration of a first embodiment of a lens system that includes seven lens elements.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a small form factor camera including a photosensor and a compact lens system are described. Embodiments of a compact lens system including seven lens elements are described that may be used in the camera and that provide a low F-number (<=2.1), wide field of view (e.g., 75 degrees or greater) and short total track length (e.g., 6.8 mm or less) that allow the camera to be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers, and so on. However, note that aspects of the camera (e.g., the lens system and photosensor) may be scaled up or down to provide cameras with larger or smaller package sizes than those described. In addition, embodiments of the camera system may be implemented as standalone digital cameras. In addition to still (single frame capture) camera applications, embodiments of the camera system may be adapted for use in video camera applications.

Embodiments of the lens system may be used in small form factor cameras to capture high brightness, high resolution images. Embodiments of the lens system include seven lens elements with refractive power. Lens system parameters and relationships including but not limited to power distribution, lens shape, thickness, aperture location, geometry, position, materials, spacing, and the surface shapes of certain lens elements may be selected at least in part to reduce, compensate, or correct for optical aberrations and lens artifacts and effects across the field of view including one or more of but not limited to vignetting, chromatic aberration, the field curvature or Petzval sum, and lens flare.

FIGS. 1A, 2A, 3A, 4A, 5A, 6A, 7A, and 8A illustrate several example embodiments of lens systems that include seven refracting lens elements. The example embodiments may provide an F-number (focal ratio) of 1.85 or less, with focal length (f) of 5.0 mm or less, and a total track length (TTL) of less than 6.8 mm (assuming a semi-diagonal image height of 4.0). Note, however, that these examples are not intended to be limiting, and that variations on the various parameters given for the lens systems are possible while still achieving similar results.

The refractive lens elements in embodiments of the lens system may, for example, be composed of a plastic material. In some embodiments, the refractive lens elements may be composed of an injection molded plastic material. However, other transparent materials (e.g., glass) may be used. Also note that, in a given embodiment, different ones of the lens elements may be composed of materials with different optical characteristics, for example different Abbe numbers and/or different refractive indices. The Abbe number, $V_d$, may be defined by the equation:

$$V_d = (V_d - 1)/(N_F - N_C),$$

where $N_F$ and $N_C$ are the refractive index values of the material at the F and C lines of hydrogen, respectively.

In FIGS. 1A, 2A, 3A, 4A, 5A, 6A, 7A, and 8A, an example camera includes at least a compact lens system and a photosensor. The photosensor may be an integrated circuit (IC) technology chip or chips implemented according to any of various types of photosensor technology. Examples of photosensor technology that may be used are charge-coupled device (CCD) technology and complementary metal-oxide-semiconductor (CMOS) technology. In some embodiments, pixel size of the photosensor may be 1.2 microns or less, although larger pixel sizes may be used. In a non-limiting example embodiment, the photosensor may be manufactured according to a 1280×720 pixel image format to capture 1 megapixel images. However, other pixel formats may be used in embodiments, for example 5 megapixel, 10 megapixel, or larger or smaller formats. In the example embodiments, an example photosensor with a full diagonal dimension of 8 mm (semi-diagonal 4 mm) may be used; however, larger or smaller photosensors may be used with appropriate adjustment of the lens system dimensions.

The lens system may also include an aperture stop located between the object side of the optical system and the third lens element for controlling the brightness of the optical system. In some embodiments, the aperture stop may be located at the first lens element at or behind the front vertex of the lens system. In some embodiments, the aperture stop may instead be located between the first and second lens elements. In some embodiments, the lens system may also include one or more secondary stops, for example a secondary stop located at the object side surface of the fourth lens element, or two secondary stops, with one located at the image side surface of the second lens element and one located at the image side surface of the fourth lens element. The secondary stop(s) may, for example, help in aberration control in low F-number and wide FOV conditions by cutting off a percentage of the off-axis ray bundles.

The camera may also, but does not necessarily, include an infrared (IR) filter, for example located between the last or seventh lens element of the lens system and the photosensor. The IR filter may, for example, be composed of a glass material. However, other materials may be used. In some embodiments, the IR filter does not have refractive power, and does not affect the effective focal length f of the lens system. In some embodiments, instead of an IR filter as shown in the Figures, a coating may be used on one or more of the lens elements, or other methods may be used, to provide IR filtering. Further note that the camera may also include other components than those illustrated and described herein.

In the camera, the lens system forms an image at an image plane (IP) at or near the surface of the photosensor. The image size for a distant object is directly proportional to the effective focal length f of a lens system. The total track length (TTL) of the lens system is the distance on the optical axis (AX) between the front vertex at the object side surface of the first (object side) lens element and the image plane. The ratio of total track length to focal length (TTL/f) is referred to as the telephoto ratio. To be classified as a telephoto lens system, TTL/f is less than or equal to 1. For a non-telephoto lens system, the telephoto ratio is greater than 1.

In the non-limiting example embodiments described herein, the lens system may be configured such that the effective focal length f of the lens system is within a range of 3.4 to 5 mm, and the F-number is within a range of 1.6 to 1.85. The lens system may, for example, be configured as shown in the examples to satisfy specified optical, imaging, and/or packaging constraints for particular camera system applications. Note that the F-number, also referred to as the focal ratio or f/#, is defined by f/D, where D is the diameter of the entrance pupil, i.e. the effective aperture. As an example, in the embodiment illustrated in FIG. 1A, at f=4.996 mm, an F-number of 1.7 is achieved with an effective aperture of @2.94 mm. The example embodiments may, for example, be configured with a full field of view (FOV) within a range of 75 to 94 degrees. In some embodiments, photosensor with a full diagonal dimension of 8 mm (semi-diagonal 4 mm) may be used. The lens systems may satisfy a criterion for compactness as defined in the following relationship:

$$TTL/ImageH < 1.7$$

where TTL is the total track length of the lens system when focused at infinity, and where ImageH is the semi-diagonal image height on the image plane at the photosensor. Thus, TTL of the example embodiments may be less than 6.8 mm, assuming a semi-diagonal image height of 4 mm. Telephoto ratio (TTL/f) of an example embodiment with effective focal length f of about 5.0 and TTL of about 6.5 is thus at or about 1.3.

However, note that the focal length f, F-number, TTL, photosensor size, and/or other lens system and camera parameters may vary in different embodiments, and may be scaled or adjusted to meet various specifications of optical, imaging, and/or packaging constraints for other camera system applications. Constraints for a camera system that may be specified as requirements for particular camera system applications and/or that may be varied for different camera system applications include but are not limited to the focal length f, effective aperture, TTL, aperture stop location, F-number, field of view (FOV), telephoto ratio, photosensor size, imaging performance requirements, and packaging volume or size constraints.

In some embodiments, the lens system may be adjustable. For example, in some embodiments, a lens system as described herein may be equipped with an adjustable iris (entrance pupil) or aperture stop. Using an adjustable aperture stop, the F-number (focal ratio, or f/#) may be dynamically varied within a range. For example, if the lens system is well corrected at f/1.7, at a given focal length f and FOV, then the focal ratio may be varied within a range of 1.4 to 8 (or higher) by adjusting the aperture stop assuming that the aperture stop can be adjusted to the F-number setting. In some embodiments, the lens system may be used at faster focal ratios (<1.7) by adjusting the aperture stop at the same FOV (e.g. 81 degrees), possibly with degraded imaging quality performance, or with reasonably good performance at a smaller FOV.

While ranges of values may be given herein as examples for adjustable cameras and lens systems in which one or more optical parameters may be dynamically varied (e.g., using an adjustable aperture stop), embodiments of camera systems that include fixed (non-adjustable) lens systems in which values for optical and other parameters are within these ranges may be implemented.

Figure 2A:
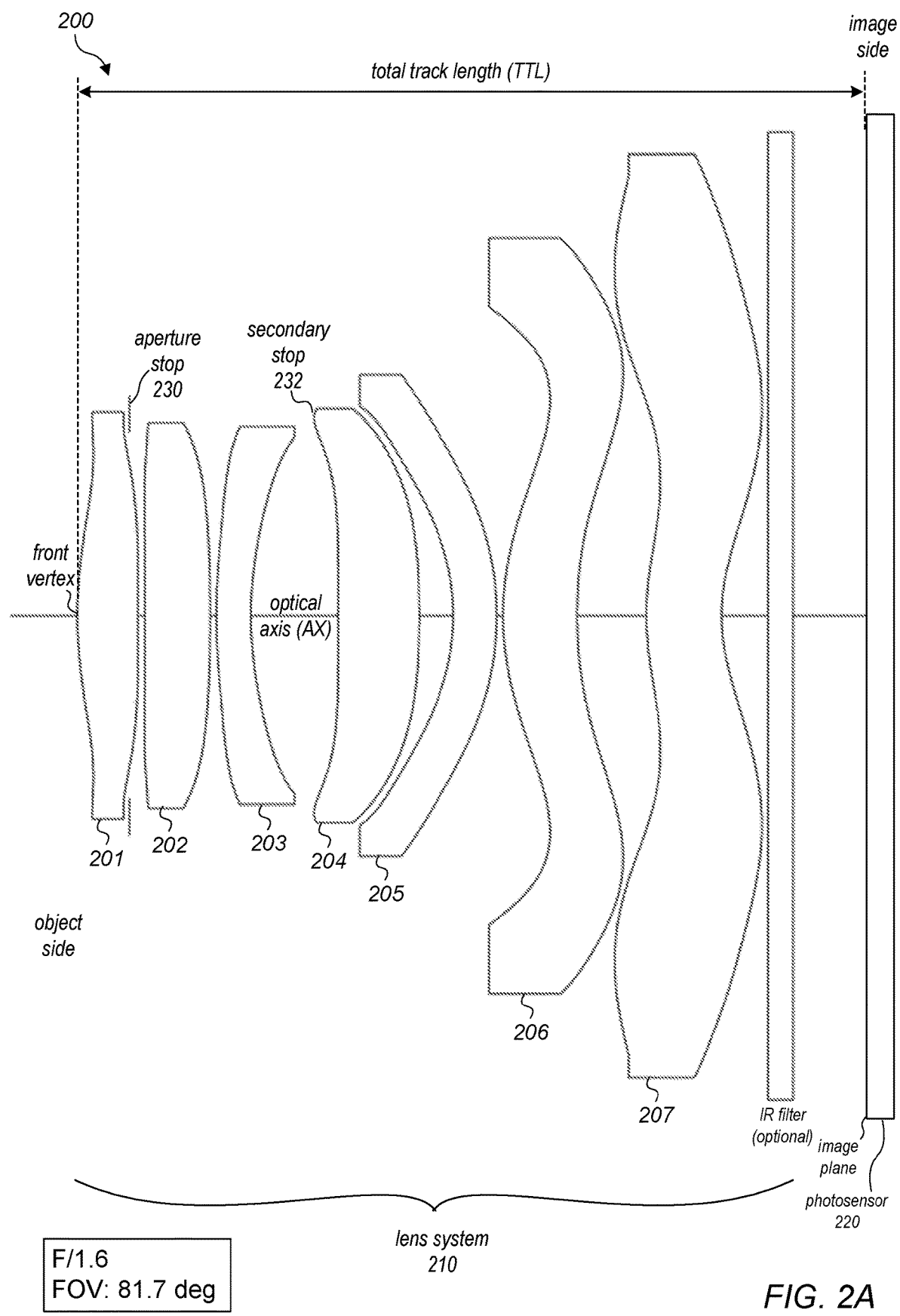
FIG. 2A is a cross-sectional illustration of a second embodiment of a lens system that includes seven lens elements.

Referring to the example embodiments as illustrated in FIGS. 1A, 2A, 3A, 4A, 5A, 6A, 7A, and 8A, an example camera includes at least a compact lens system and a photosensor. The camera may include an aperture stop, for example at the first lens element and at or behind the front vertex of the lens system as illustrated in FIG. 1A, for controlling brightness of the optical system. In some embodiments, the aperture stop may instead be located between the first and second lens elements, for example as illustrated in FIG. 2A. In some embodiments, the camera may also include one or more secondary stops, for example two secondary stops as illustrated in FIG. 1A or a single secondary stop as illustrated in FIG. 2A. The camera may also, but does not necessarily, include an infrared (IR) filter, for example located between the lens system and the photosensor. The IR filter may act to reduce or eliminate interference of environmental noises on the photosensor and/or to block infrared radiation that could damage or adversely affect the photosensor, and may be configured so as to have no effect on f.

In embodiments, the lens system may include seven lens elements with refractive power and effective focal length f, arranged along an optical axis AX in order from an object side to an image side:
  a first lens element L1 with positive refractive power;
  a second lens element L2;
  a third lens element L3 with negative refractive power;
  a fourth lens element L4 with positive refractive power;
  a fifth lens element L5;
  a sixth lens element L6 with positive refractive power; and
  a seventh lens element L7.

The second, fifth, and seventh lens elements may have either positive or negative refractive power in various embodiments.

In some embodiments the third lens element has a concave image-side surface in the paraxial region.

In some embodiments, the fifth lens element has a concave object-side surface and a convex image-side surface.

In some embodiments, the sixth lens element has a convex object-side surface in the paraxial region. In some embodiments, both the object-side surface and the image-side surface of the sixth lens element are aspheric. In some embodiments, the object-side surface has at least one part being concave near the peripheral region.

In some embodiments, the seventh lens element has a concave image-side surface in the paraxial region. In some embodiments, both the object-side surface and the image-side surface of the seventh lens element are aspheric. In some embodiments, the object-side surface has at least one part being concave near the peripheral region, and the image-side surface has at least one part being convex near the peripheral region.

In some embodiments, the lens system may satisfy one or more of the following relationships:

$$0.6<(f_{system}/f12)<1.4$$

$$0.55<|f_{system}/f3|+|f_{system}/f5|<1.15$$

$$(R9+R10)/(R9-R10)<-2$$

$$0.8<(Vd1+Vd3)/Vd2<3$$

$$Vd6>45$$

where $f_{system}$ is the effective focal length of the lens system, f12 is the composite focal length of the first and second lens elements, f3 is effective focal length of the third lens element, f5 is effective focal length of the fifth lens element, R9 is radius of curvature of the object side surface of the fifth lens element, R10 is radius of curvature of the image side surface of the fifth lens element, and Vd1, Vd2, Vd3, and Vd6 are the Abbe numbers of the first, second, third, and sixth lens elements, respectively.

Embodiments of a lens system may be implemented to be compact for use in small form factor cameras for consumer electronics products such as smartphones and tablet/pad devices. A criterion for compactness of the lens system may be defined in the following relationship:

$$TTL/ImageH<1.7$$

where ImageH is the semi-diagonal image height on the image plane at the photosensor. Thus, in the example lens systems as defined in the Tables, total track length (TTL) is less than 6.8 mm assuming a photosensor with semi-diagonal image height of 4 mm is used. The relationship (TTL/ImageH<1.7) for the example embodiments (6.8 mm/4 mm=1.7) is thus satisfied. Note that this criterion for compactness allows for proportionally longer TTL when using larger photosensors, and proportionally shorter TTL when using smaller photosensors. For example, TTL of a lens system for a photosensor with ImageH of about 3 mm would be less than 5.1 mm, and TTL of a lens system for a photosensor with ImageH of about 5 mm would be less than 8.5 mm.

In the example embodiments, the lenses may be formed of various optical materials with various Abbe numbers; the materials and power configurations of lenses L1 through L7 may be selected to, for example, reduce chromatic aberrations.

Lens System 110

FIG. 1A illustrates an example camera 100 with a lens system 110 that includes seven refractive lens elements, according to some embodiments. Tables 1A through 1F provide example values for various optical and physical parameters of camera 100 and lens system 110. Lens system 110 may include seven lens elements with refractive power, arranged along an optical axis AX in order from an object side to an image side:

a first lens element 101 with positive refractive power;
a second lens element 102 with negative refractive power;
a third lens element 103 with negative refractive power;
a fourth lens element 104 with positive refractive power;
a fifth lens element 105 with refractive power;
a sixth lens element 106 with positive refractive power; and
a seventh lens element 107 with refractive power.

As shown in FIG. 1A, lens system 110 system may include an aperture stop 130 at or near the object side surface of lens 101, and two internal stops (secondary stop 132A at the image side surface of lens 102, and secondary stop 132B at the image side surface of lens 104) in addition to the aperture stop 130. The lens system 110 may be designed to compensate for loss of illumination and possible vignetting that may result from the internal stops 132. The camera 100 may include an IR filter located between lens element 107 and photosensor 120.

Lens system 110 may have an effective focal length f of 4.996, F-number of 1.7, and full field of view (FFOV) of 76.7 degrees. The relationship TTL/ImageH for lens system 110 is 1.57. Thus, assuming ImageH=4 mm, TTL of lens system 110 is about 6.28 mm. The relationship (Vd1+Vd3)/Vd2 for lens system 110 is 2.804. Vd6 for lens system 110 is 56.0. The relationship ($f_{system}$/f12) for lens system 110 is 0.707. The relationship|$f_{system}$/f3|+|$f_{system}$/f5 for lens system 110 is 0.871. The relationship (R9+R10)/(R9−R10) for lens system 110 is −4.876.

Figure 1B:
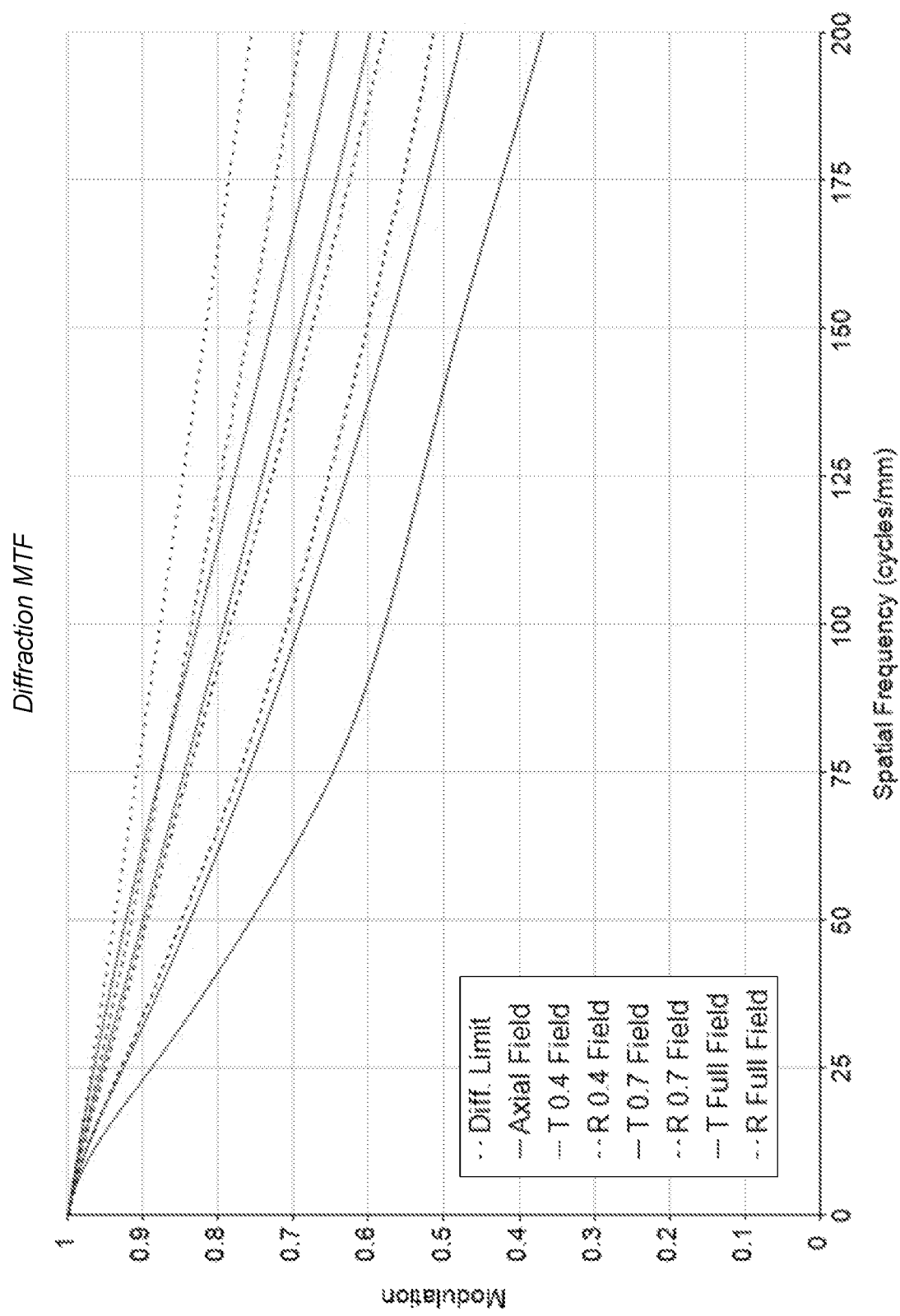
FIG. 1B is a graph illustrating the modulation transfer function (MTF) for a lens system as illustrated in FIG. 1A.

FIG. 1B is a graph illustrating the modulation transfer function (MTF) for a lens system 110 as illustrated in FIG. 1A, according to some embodiments. FIG. 1B shows the lens MTF evaluated at 0 field, 0.4 field, 0.7 field and full field respectively. MTFs are higher than 0.5 at 100 line pairs (lp)/mm, showing good contrast for high-resolution imaging and rendering high-quality images using high-resolution sensors.

Figure 1C:
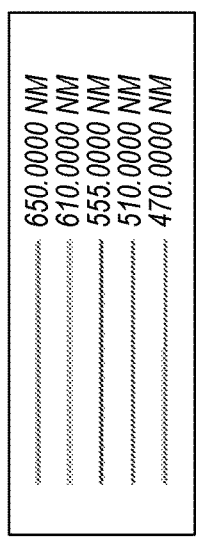
FIG. 1C shows the longitudinal spherical aberration, field curvature and distortion for a lens system as illustrated in FIG. 1A.
Figure 1C:
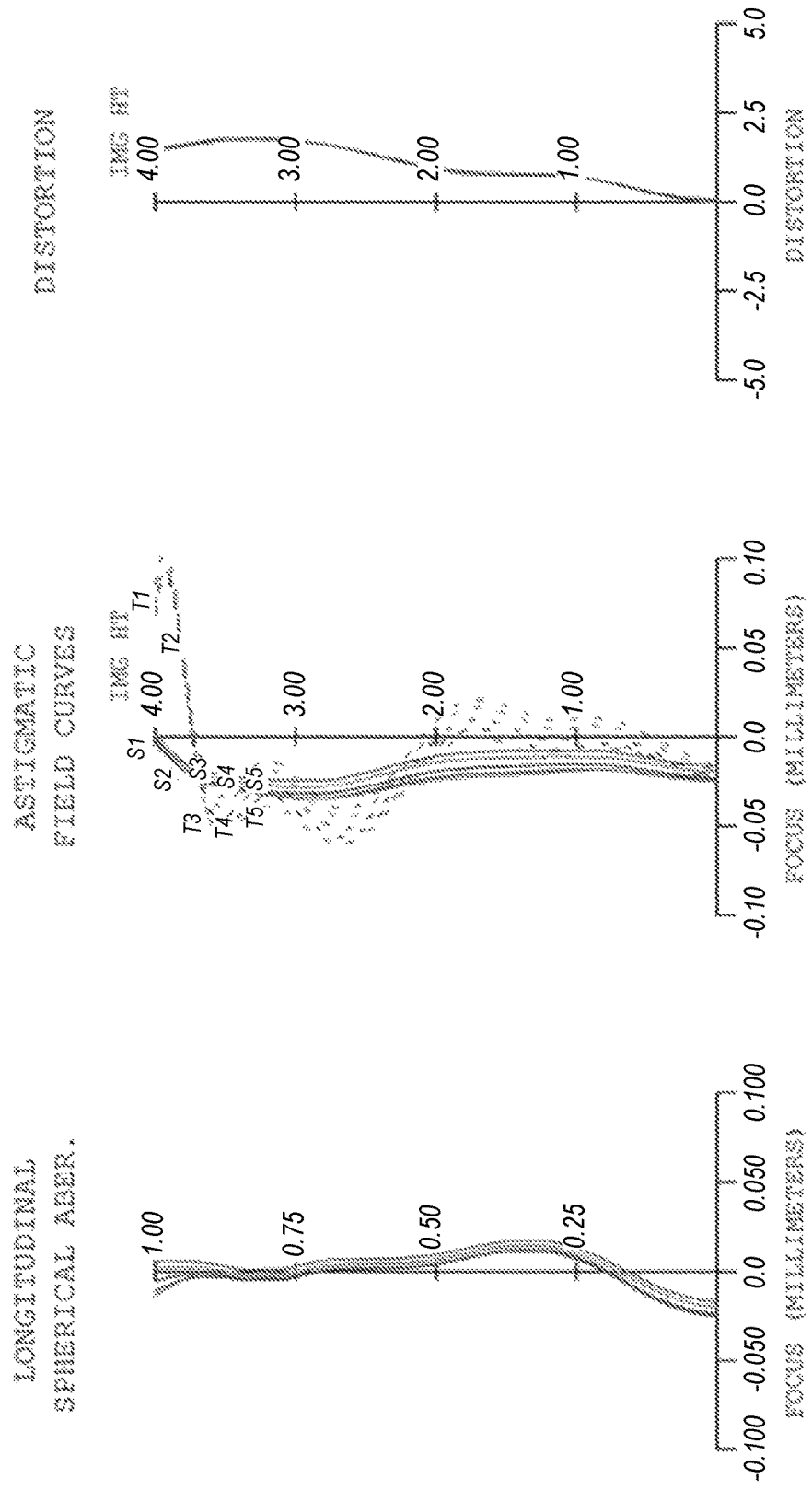

FIG. 1C shows the longitudinal spherical aberration, field curvature and distortion for a lens system 110 as illustrated in FIG. 1A, according to some embodiments. As shown in FIG. 1C, optical distortion across the field of view is controlled within 2.5%, while field curvature and astigmatism are well balanced across the field of view.

Lens System 210

FIG. 2A illustrates an example camera 200 with a lens system 210 that includes seven refractive lens elements, according to some embodiments. Tables 2A through 2F provide example values for various optical and physical parameters of camera 200 and lens system 210. Lens system 210 may include seven lens elements with refractive power, arranged along an optical axis AX in order from an object side to an image side:

a first lens element 201 with positive refractive power;
a second lens element 202 with positive refractive power;
a third lens element 203 with negative refractive power;
a fourth lens element 204 with positive refractive power;
a fifth lens element 205 with refractive power;
a sixth lens element 206 with positive refractive power; and
a seventh lens element 207 with refractive power.

As shown in FIG. 2A, lens system 210 system may include an aperture stop 230 at or near the image side surface of lens 201, and a secondary stop 232 at the object side surface of lens 204. The lens system 210 may be designed to compensate for loss of illumination and possible vignetting that may result from the internal stop 232. The camera 200 may include an IR filter located between lens element 207 and photosensor 220.

Lens system 210 may have an effective focal length f of 4.672, F-number of 1.6, and full field of view (FFOV) of 81.7 degrees. The relationship TTL/ImageH for lens system 210 is 1.584. Thus, assuming ImageH=4 mm, TTL of lens system 210 is about 6.336 mm. The relationship (Vd1+Vd3)/Vd2 for lens system 210 is 1.34. Vd6 for lens system 210 is 56.0. The relationship ($f_{system}$/f12) for lens system 210 is 0.999. The relationship|$f_{system}$/f3|+|$f_{system}$/f5 for lens system 210 is 0.738. The relationship (R9+R10)/(R9−R10) for lens system 210 is −6.824.

Figure 2B:
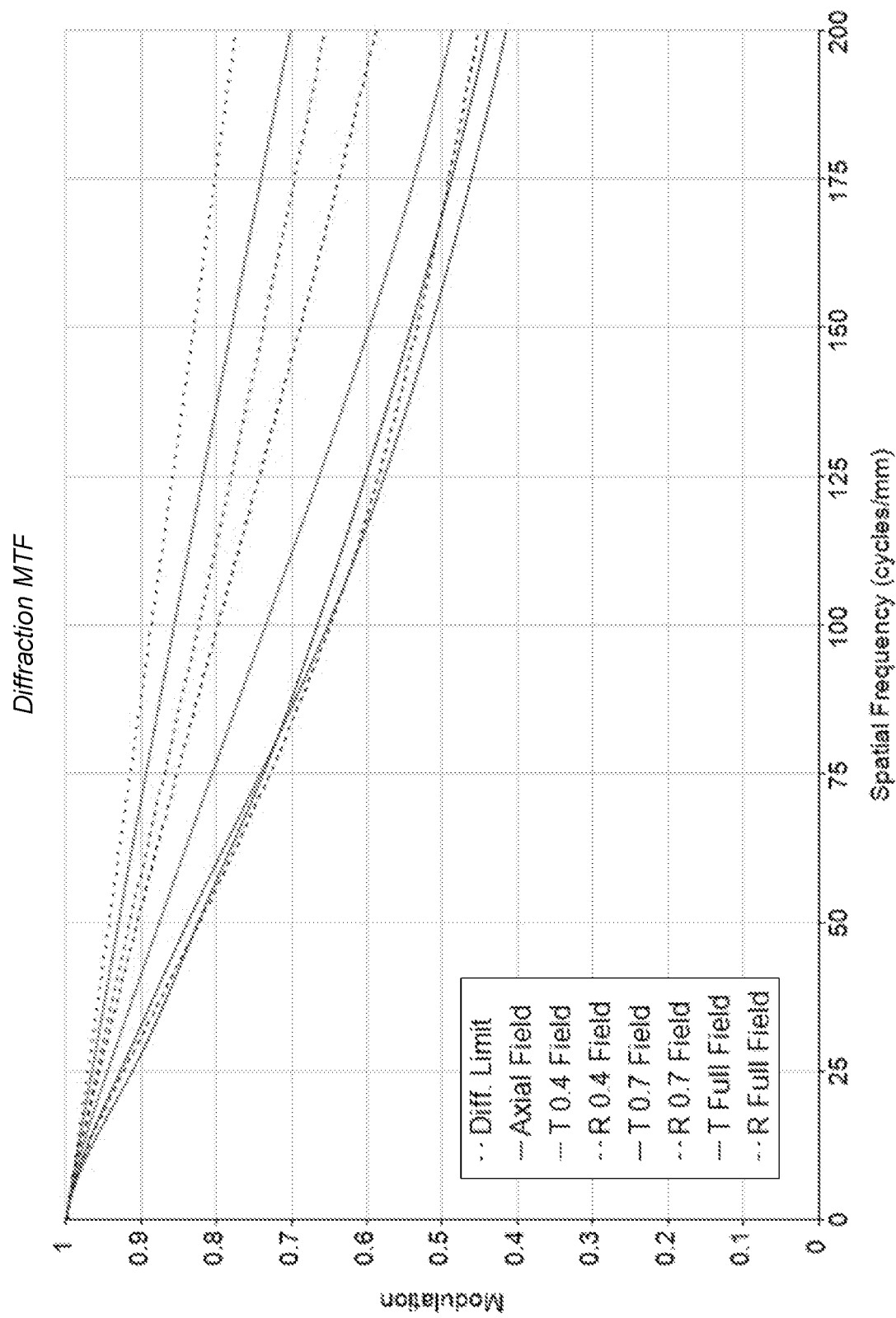
FIG. 2B is a graph illustrating the MTF for a lens system as illustrated in FIG. 2A.

FIG. 2B is a graph illustrating the modulation transfer function (MTF) for a lens system 210 as illustrated in FIG. 2A, according to some embodiments. FIG. 2B shows the lens MTF evaluated at 0 field, 0.4 field, 0.7 field and full field respectively. MTFs are higher than 0.5 at 100 line pairs (lp)/mm, showing good contrast for high-resolution imaging and rendering high-quality images using high-resolution sensors.

Figure 2C:
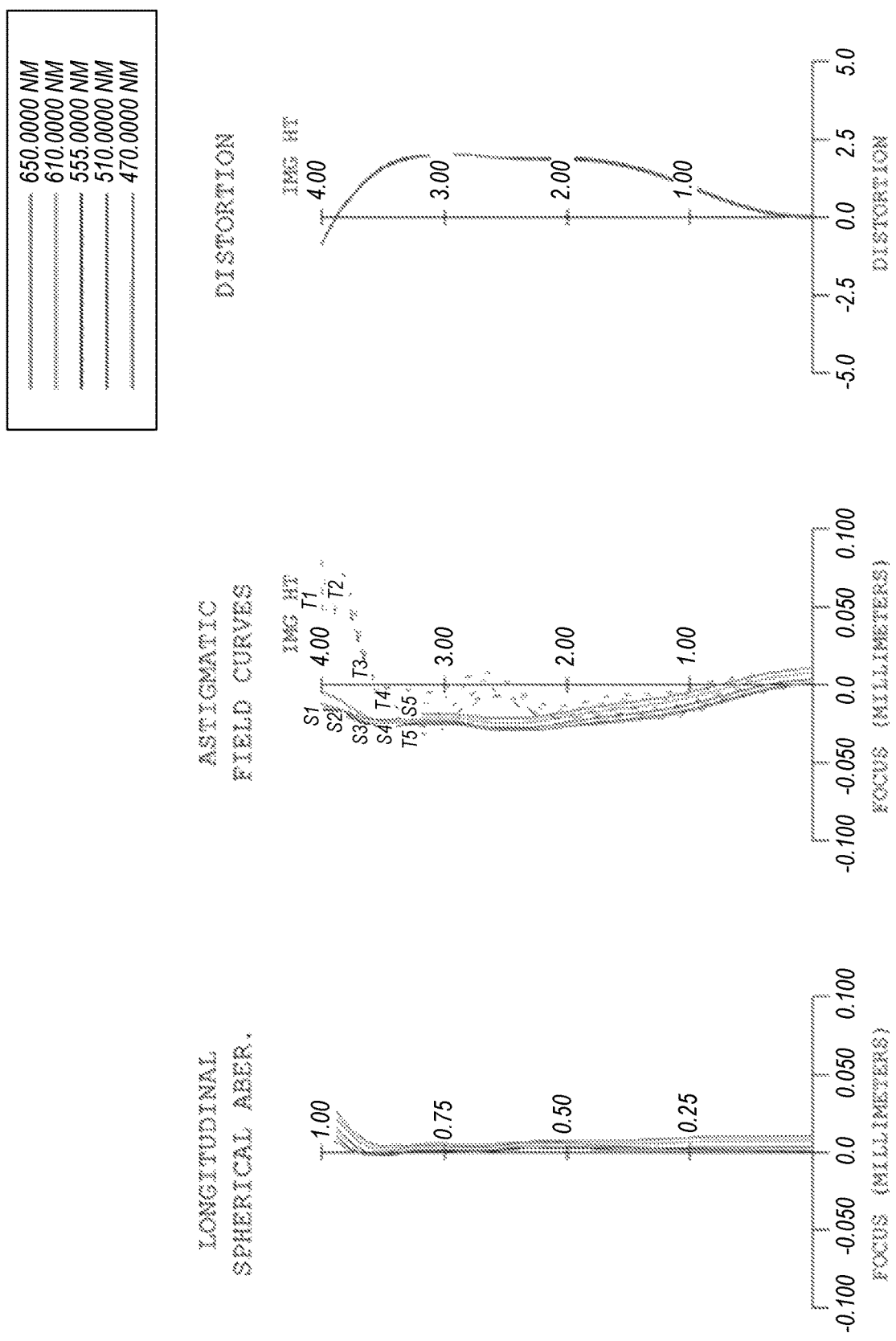
FIG. 2C shows the longitudinal spherical aberration, field curvature and distortion for a lens system as illustrated in FIG. 2A.

FIG. 2C shows the longitudinal spherical aberration, field curvature and distortion for a lens system 210 as illustrated in FIG. 2A, according to some embodiments. As shown in FIG. 2C, optical distortion across the field of view is controlled within 2.5%, while field curvature and astigmatism are well balanced across the field of view.

Lens System 310

Figure 3A:
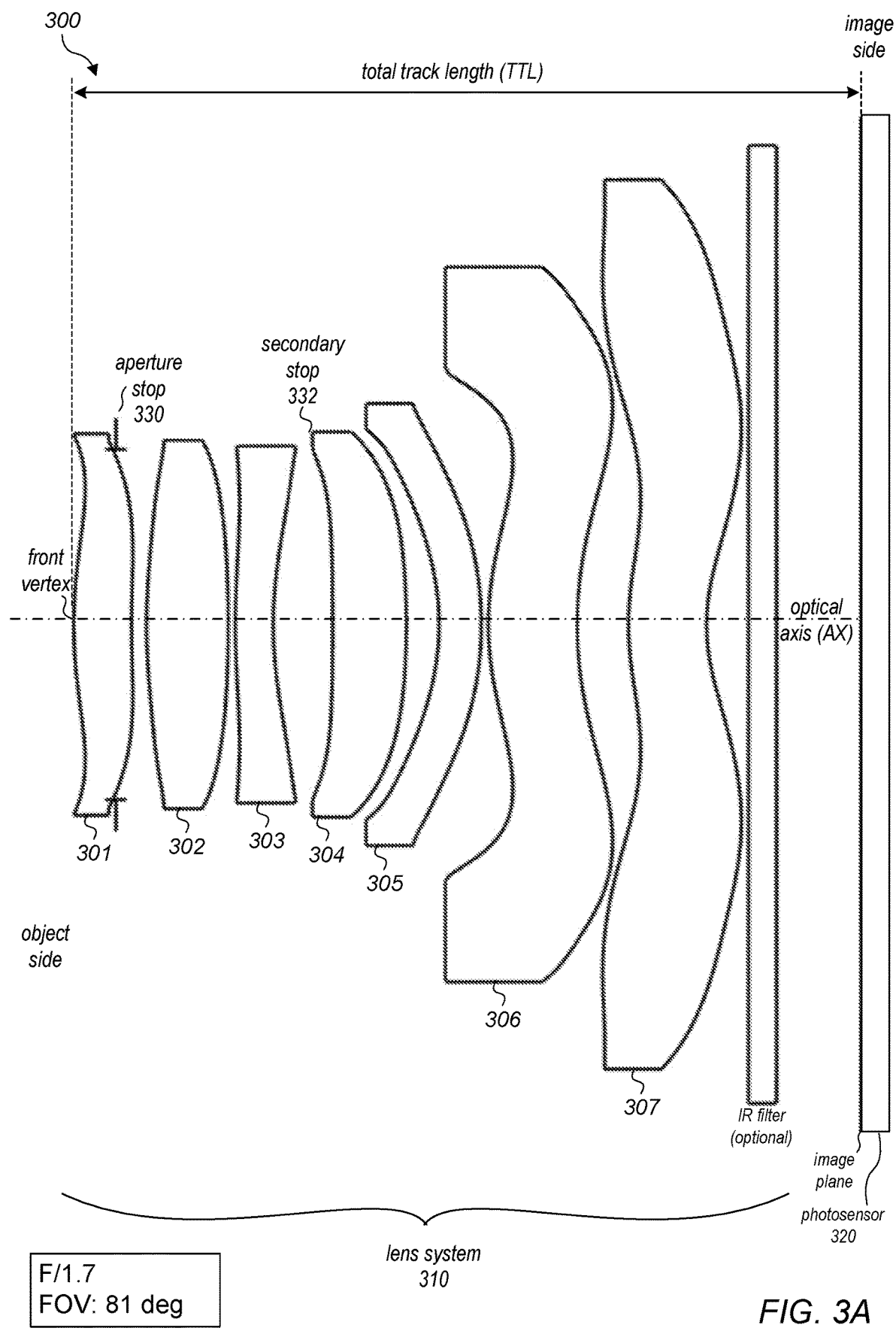
FIG. 3A is a cross-sectional illustration of a third embodiment of a lens system that includes seven lens elements.

FIG. 3A illustrates an example camera 300 with a lens system 310 that includes seven refractive lens elements, according to some embodiments. Tables 3A through 3F provide example values for various optical and physical parameters of camera 300 and lens system 310. Lens system 310 may include seven lens elements with refractive power, arranged along an optical axis AX in order from an object side to an image side:

a first lens element 301 with positive refractive power;
a second lens element 302 with positive refractive power;
a third lens element 303 with negative refractive power;
a fourth lens element 304 with positive refractive power;
a fifth lens element 305 with refractive power;
a sixth lens element 306 with positive refractive power; and
a seventh lens element 307 with refractive power.

As shown in FIG. 3A, lens system 310 system may include an aperture stop 330 at or near the image side surface of lens 301, and a secondary stop 332 at the object side surface of lens 304. The lens system 310 may be designed to compensate for loss of illumination and possible vignetting that may result from the internal stop 332. The camera 300 may include an IR filter located between lens element 307 and photosensor 320.

Lens system 310 may have an effective focal length f of 4.170, F-number of 1.7, and full field of view (FFOV) of 81.1 degrees. The relationship TTL/ImageH for lens system 310 is 1.587. Thus, assuming ImageH=4 mm, TTL of lens system 310 is about 6.348 mm. The relationship (Vd1+Vd3)/Vd2 for lens system 310 is 1.36. Vd6 for lens system 310 is 56.0. The relationship ($f_{system}$/f12) for lens system 310 is 1.125. The relationship|$f_{system}$/f3+|$f_{system}$/f5 for lens system 310 is 0.792. The relationship (R9+R10)/(R9−R10) for lens system 310 is −6.865.

Figure 3B:
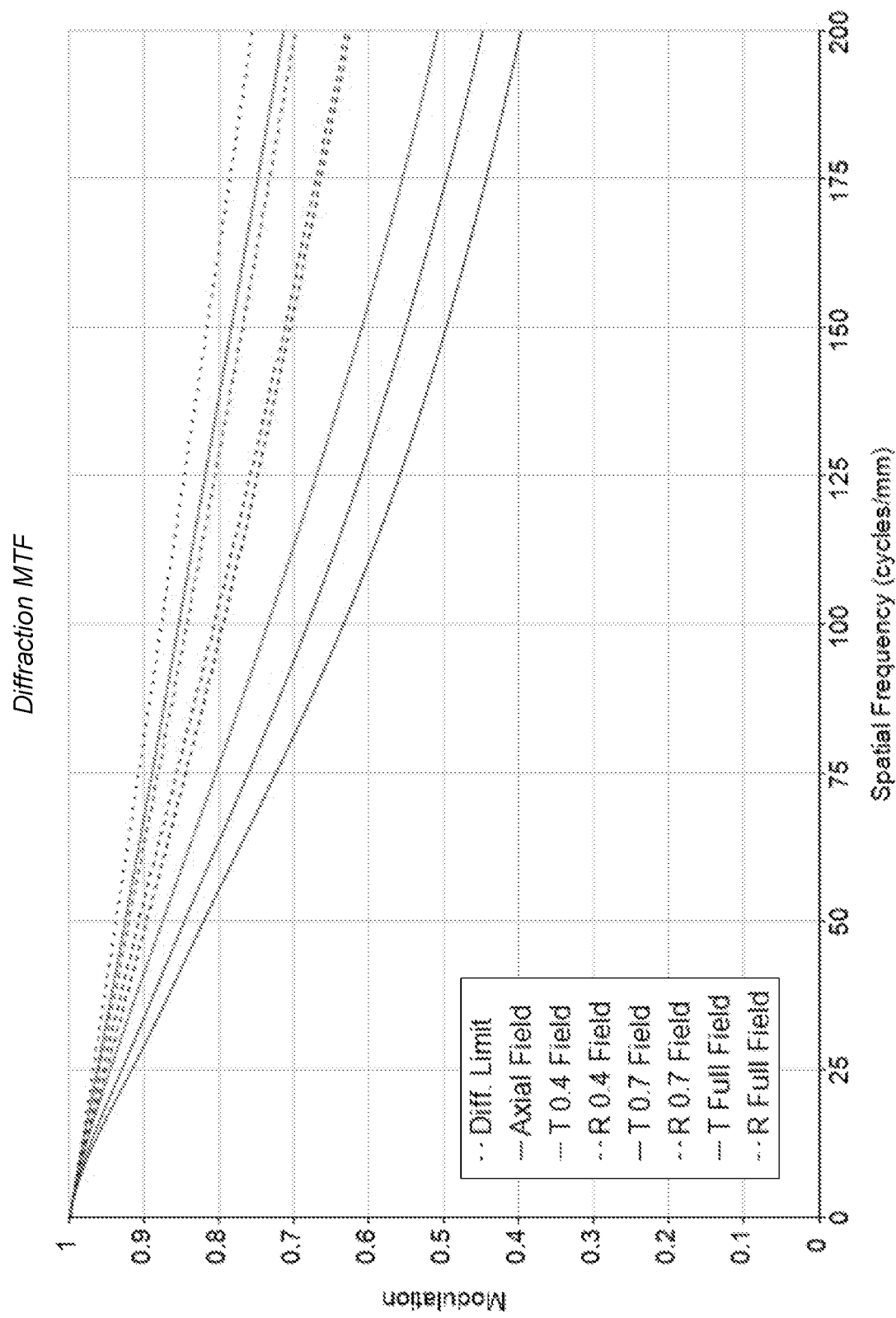
FIG. 3B is a graph illustrating the MTF for a lens system as illustrated in FIG. 3A.

FIG. 3B is a graph illustrating the modulation transfer function (MTF) for a lens system 310 as illustrated in FIG. 3A, according to some embodiments. FIG. 3B shows the lens MTF evaluated at 0 field, 0.4 field, 0.7 field and full field respectively. MTFs are higher than 0.5 at 100 line pairs (lp)/mm, showing good contrast for high-resolution imaging and rendering high-quality images using high-resolution sensors.

Figure 3C:
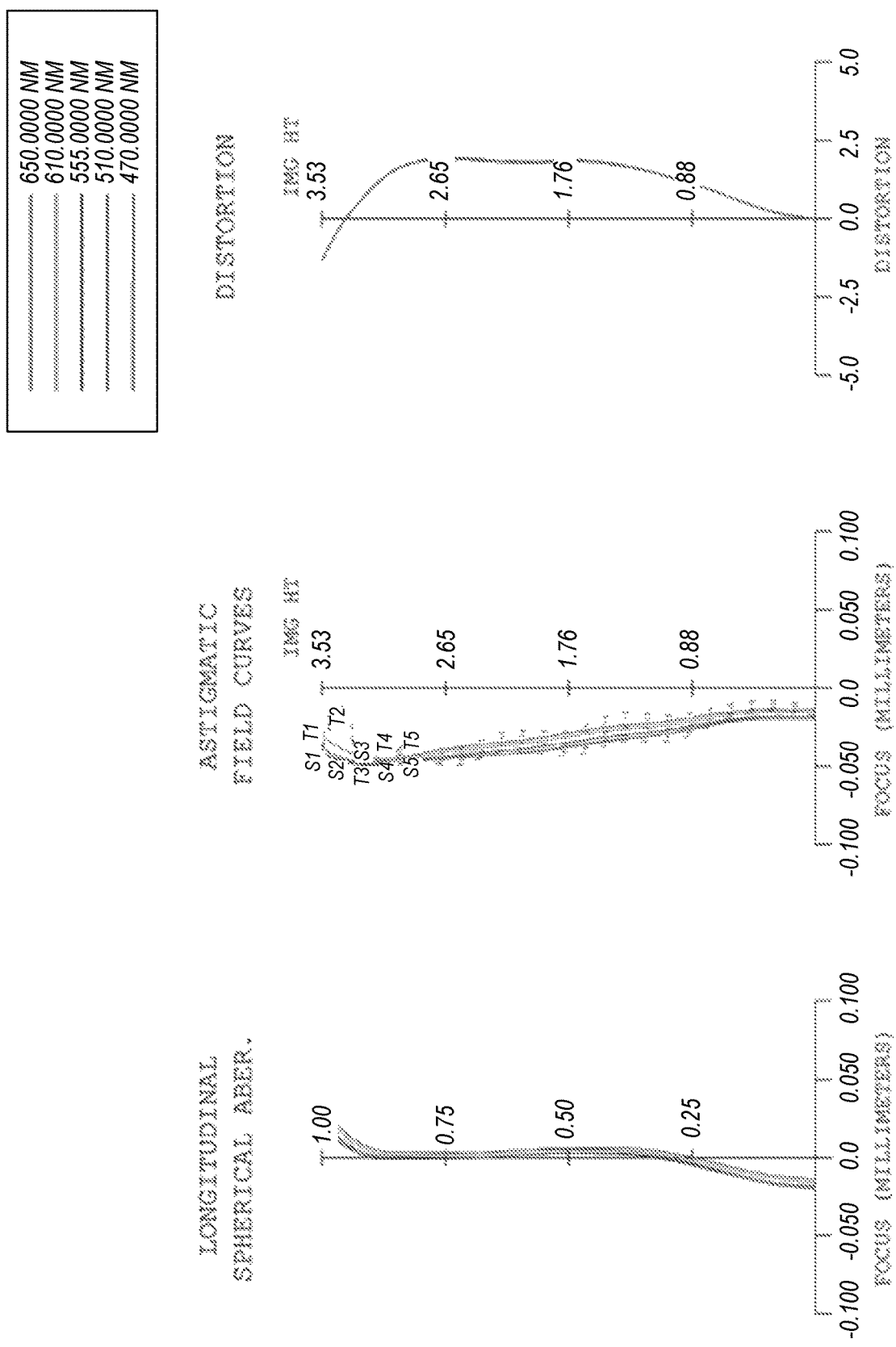
FIG. 3C shows the longitudinal spherical aberration, field curvature and distortion for a lens system as illustrated in FIG. 3A.

FIG. 3C shows the longitudinal spherical aberration, field curvature and distortion for a lens system 310 as illustrated in FIG. 3A, according to some embodiments. As shown in FIG. 3C, optical distortion across the field of view is controlled within 2.5%, while field curvature and astigmatism are well balanced across the field of view.

Lens System 410

Figure 4A:
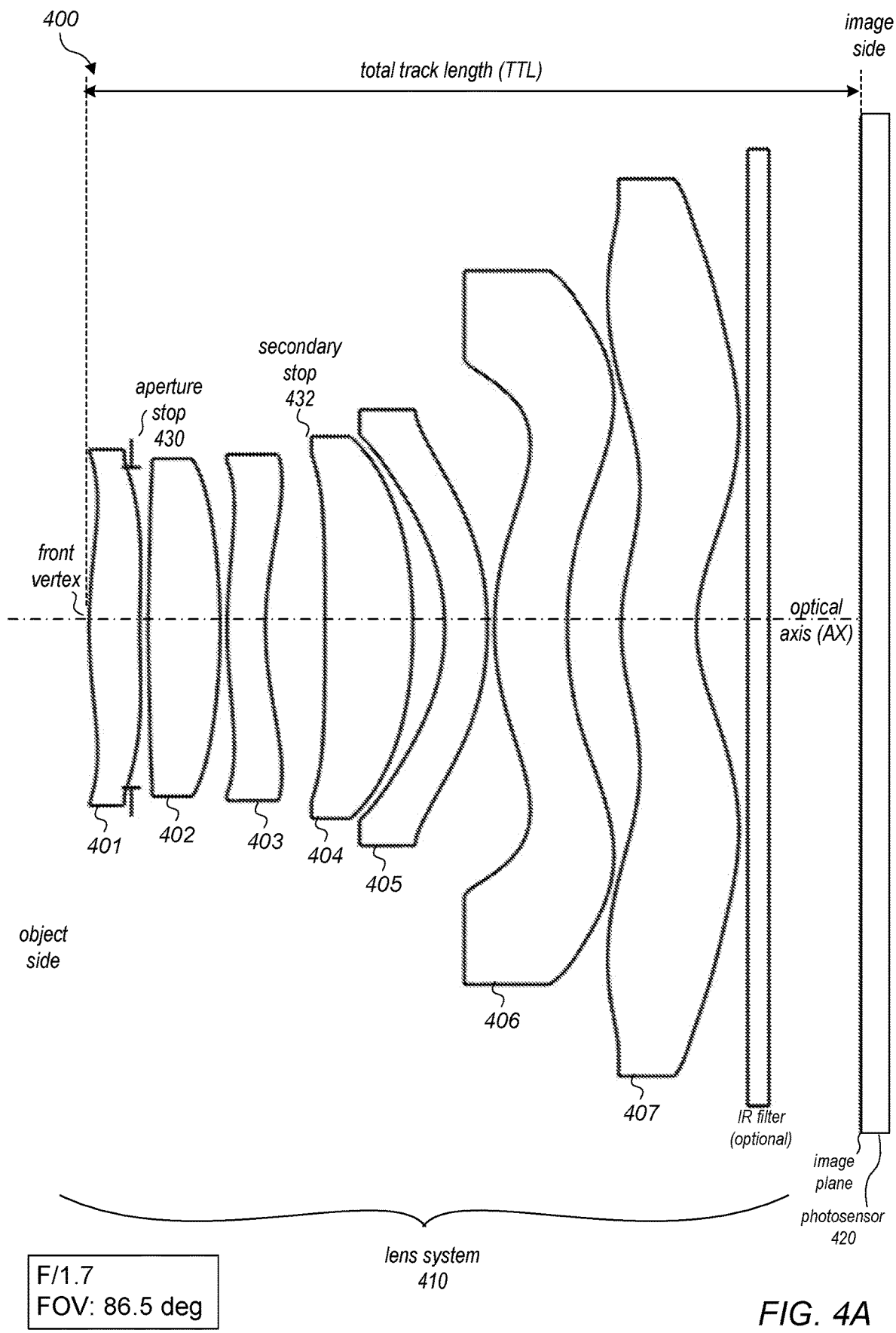
FIG. 4A is a cross-sectional illustration of a fourth embodiment of a lens system that includes seven lens elements.

FIG. 4A illustrates an example camera 400 with a lens system 410 that includes seven refractive lens elements, according to some embodiments. Tables 4A through 4F provide example values for various optical and physical parameters of camera 400 and lens system 410. Lens system 410 may include seven lens elements with refractive power, arranged along an optical axis AX in order from an object side to an image side:

a first lens element 401 with positive refractive power;
a second lens element 402 with positive refractive power;
a third lens element 403 with negative refractive power;
a fourth lens element 404 with positive refractive power;
a fifth lens element 405 with refractive power;
a sixth lens element 406 with positive refractive power; and
a seventh lens element 407 with refractive power.

As shown in FIG. 4A, lens system 410 system may include an aperture stop 430 at or near the image side surface of lens 401, and a secondary stop 432 at the object side surface of lens 404. The lens system 410 may be designed to compensate for loss of illumination and possible vignetting that may result from the internal stop 432. The camera 400 may include an IR filter located between lens element 407 and photosensor 420.

Lens system 410 may have an effective focal length f of 3.797, F-number of 1.7, and full field of view (FFOV) of 86.5 degrees. The relationship TTL/ImageH for lens system 410 is 1.547. Thus, assuming ImageH=4 mm, TTL of lens system 410 is about 6.188 mm. The relationship (Vd1+Vd3)/Vd2 for lens system 410 is 1.36. Vd6 for lens system 410 is 56.0. The relationship ($f_{system}$/f12) for lens system 410 is 0.914. The relationship|$f_{system}$/f3+|$f_{system}$/f5 for lens system 410 is 0.782. The relationship (R9+R10)/(R9−R10) for lens system 410 is −5.228.

Figure 4B:
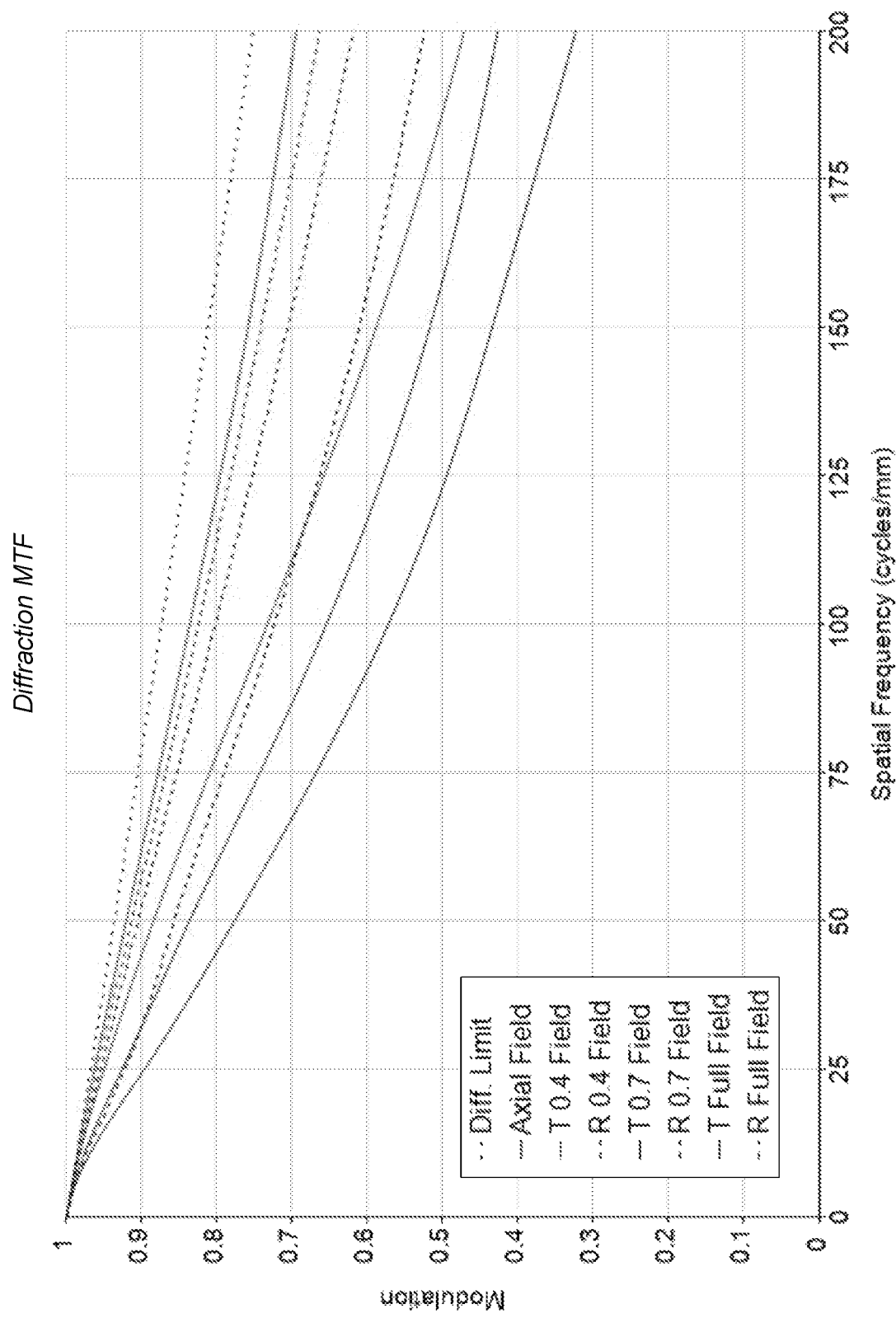
FIG. 4B is a graph illustrating the MTF for a lens system as illustrated in FIG. 4A.

FIG. 4B is a graph illustrating the modulation transfer function (MTF) for a lens system 410 as illustrated in FIG. 4A, according to some embodiments. FIG. 4B shows the lens MTF evaluated at 0 field, 0.4 field, 0.7 field and full field respectively. MTFs are higher than 0.5 at 100 line pairs (lp)/mm, showing good contrast for high-resolution imaging and rendering high-quality images using high-resolution sensors.

Figure 4C:
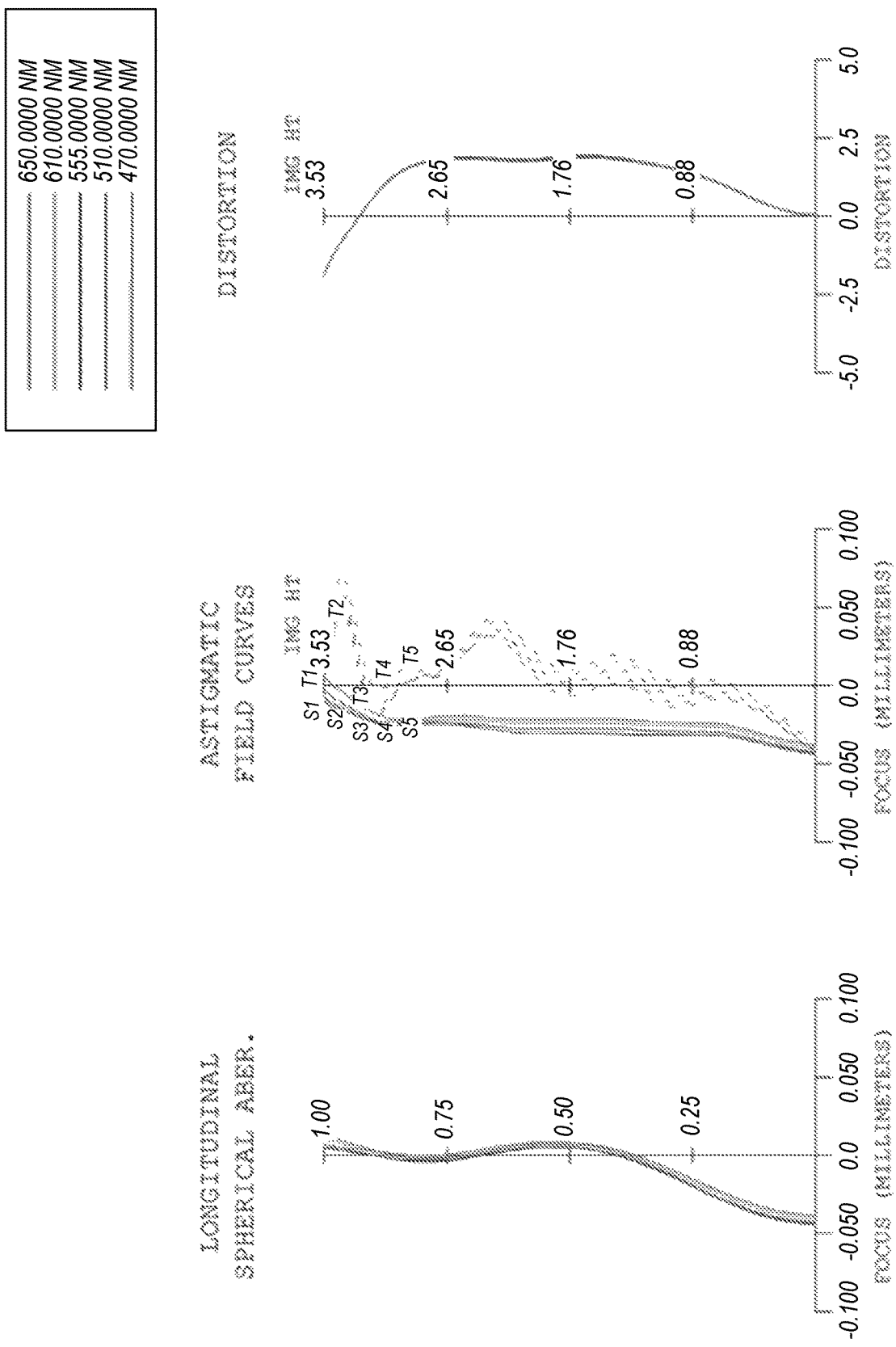
FIG. 4C shows the longitudinal spherical aberration, field curvature and distortion for a lens system as illustrated in FIG. 4A.

FIG. 4C shows the longitudinal spherical aberration, field curvature and distortion for a lens system 410 as illustrated in FIG. 4A, according to some embodiments. As shown in FIG. 4C, optical distortion across the field of view is controlled within 2.5%, while field curvature and astigmatism are well balanced across the field of view.

Lens System 510

Figure 5A:
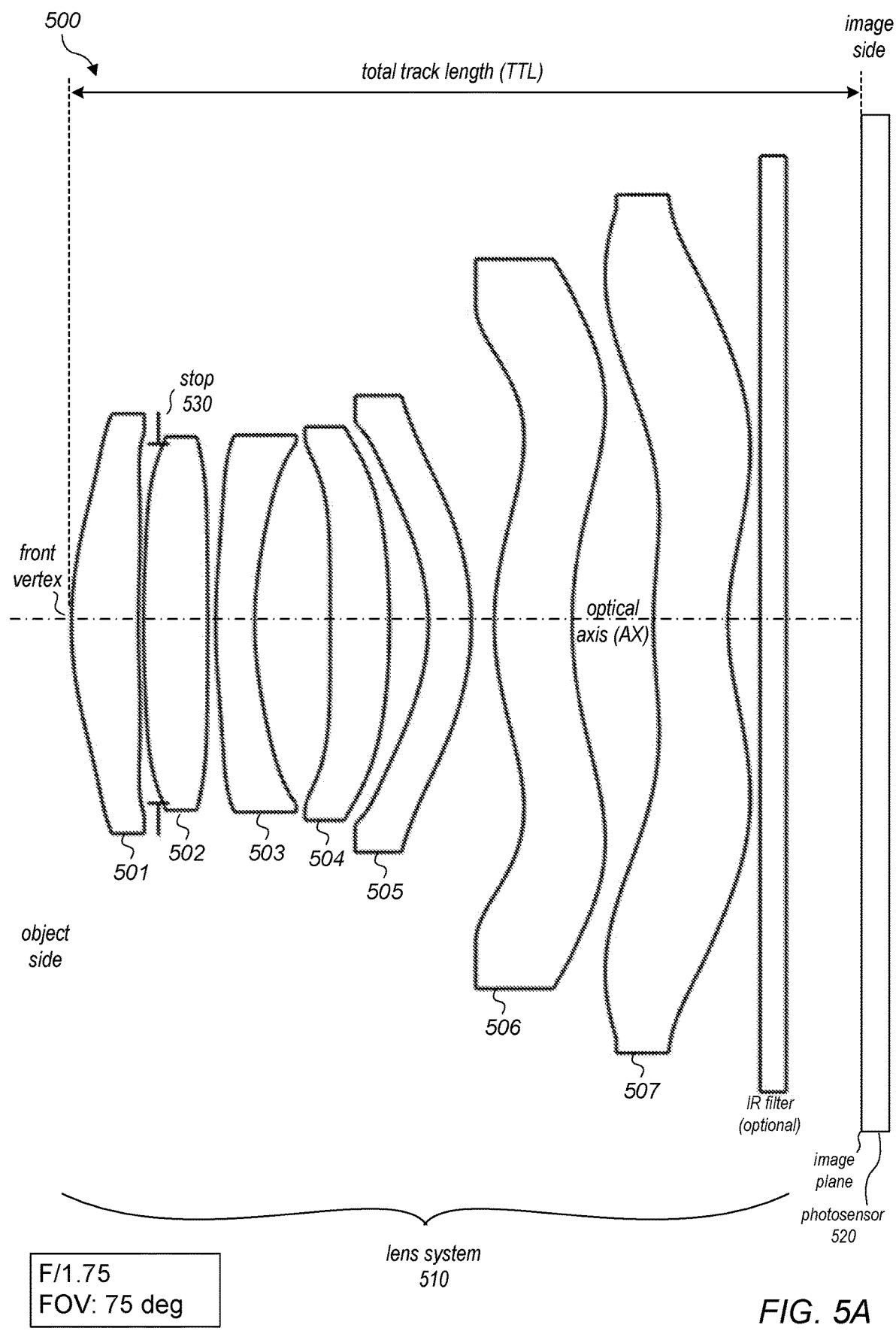
FIG. 5A is a cross-sectional illustration of a fifth embodiment of a lens system that includes seven lens elements.

FIG. 5A illustrates an example camera 500 with a lens system 510 that includes seven refractive lens elements, according to some embodiments. Tables 5A through 5F provide example values for various optical and physical parameters of camera 500 and lens system 510. Lens system 510 may include seven lens elements with refractive power, arranged along an optical axis AX in order from an object side to an image side:

a first lens element 501 with positive refractive power;
a second lens element 502 with positive refractive power;
a third lens element 503 with negative refractive power;
a fourth lens element 504 with positive refractive power;
a fifth lens element 505 with refractive power;
a sixth lens element 506 with positive refractive power; and
a seventh lens element 507 with refractive power.

As shown in FIG. 5A, lens system 510 system may include an aperture stop 530 between the image side surface of lens 501 and the object side surface of lens 502. Lens system 510 may not include a secondary stop.

Lens system 510 may have an effective focal length f of 4.889, F-number of 1.75, and full field of view (FFOV) of 75.0 degrees. The relationship TTL/ImageH for lens system 510 is 1.594. Thus, assuming ImageH=4 mm, TTL of lens system 510 is about 6.376 mm. The relationship (Vd1+Vd3)/Vd2 for lens system 510 is 1.34. Vd6 for lens system 510 is 56.0. The relationship ($f_{system}$/f12) for lens system 510 is 1.138. The relationship|$f_{system}$/f3+|$f_{system}$/f5 for lens system 510 is 0.918. The relationship (R9+R10)/(R9−R10) for lens system 510 is −6.659.

Figure 5B:
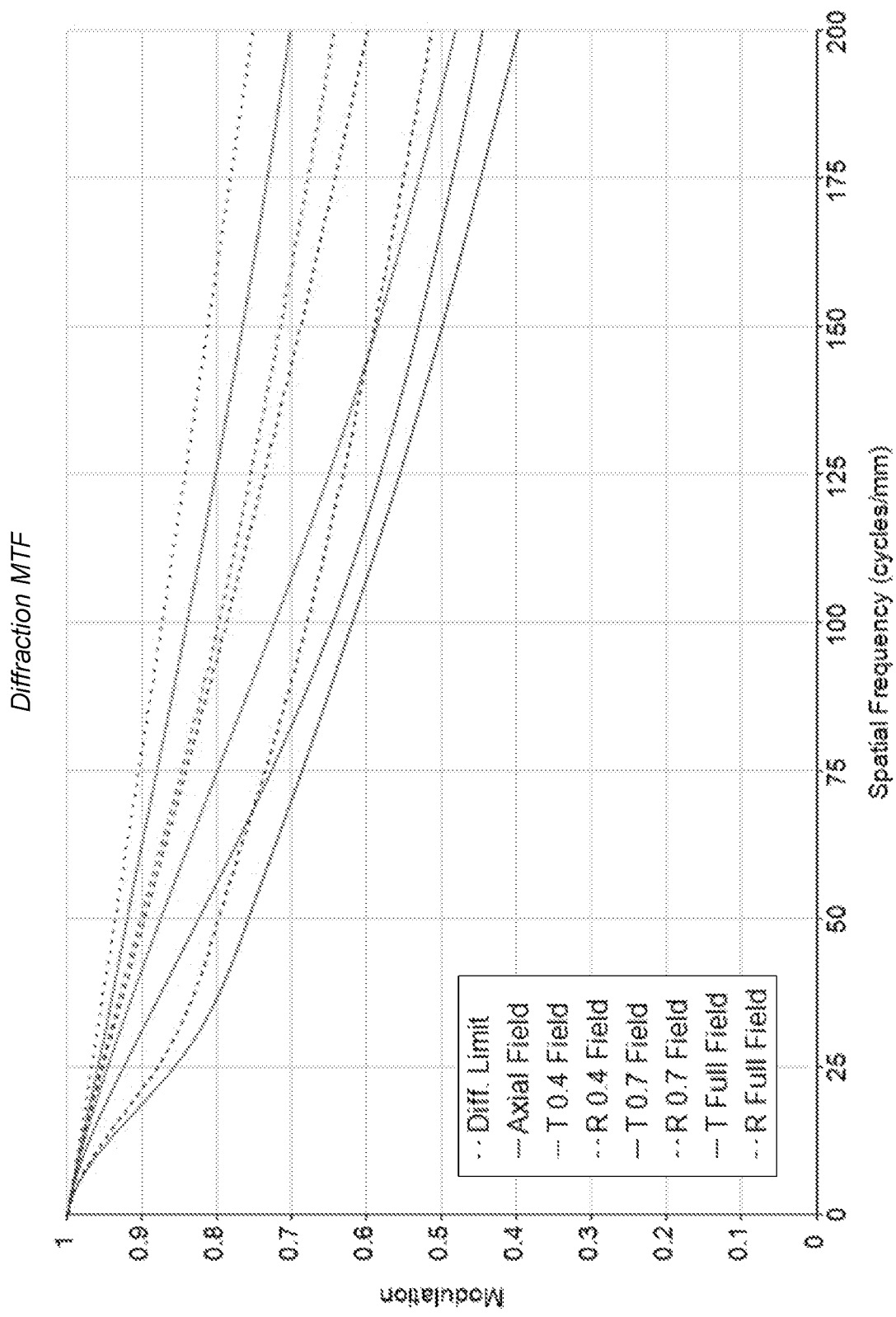
FIG. 5B is a graph illustrating the MTF for a lens system as illustrated in FIG. 5A.

FIG. 5B is a graph illustrating the modulation transfer function (MTF) for a lens system 510 as illustrated in FIG. 5A, according to some embodiments. FIG. 5B shows the lens MTF evaluated at 0 field, 0.4 field, 0.7 field and full field respectively. MTFs are higher than 0.5 at 100 line pairs (lp)/mm, showing good contrast for high-resolution imaging and rendering high-quality images using high-resolution sensors.

Figure 5C:
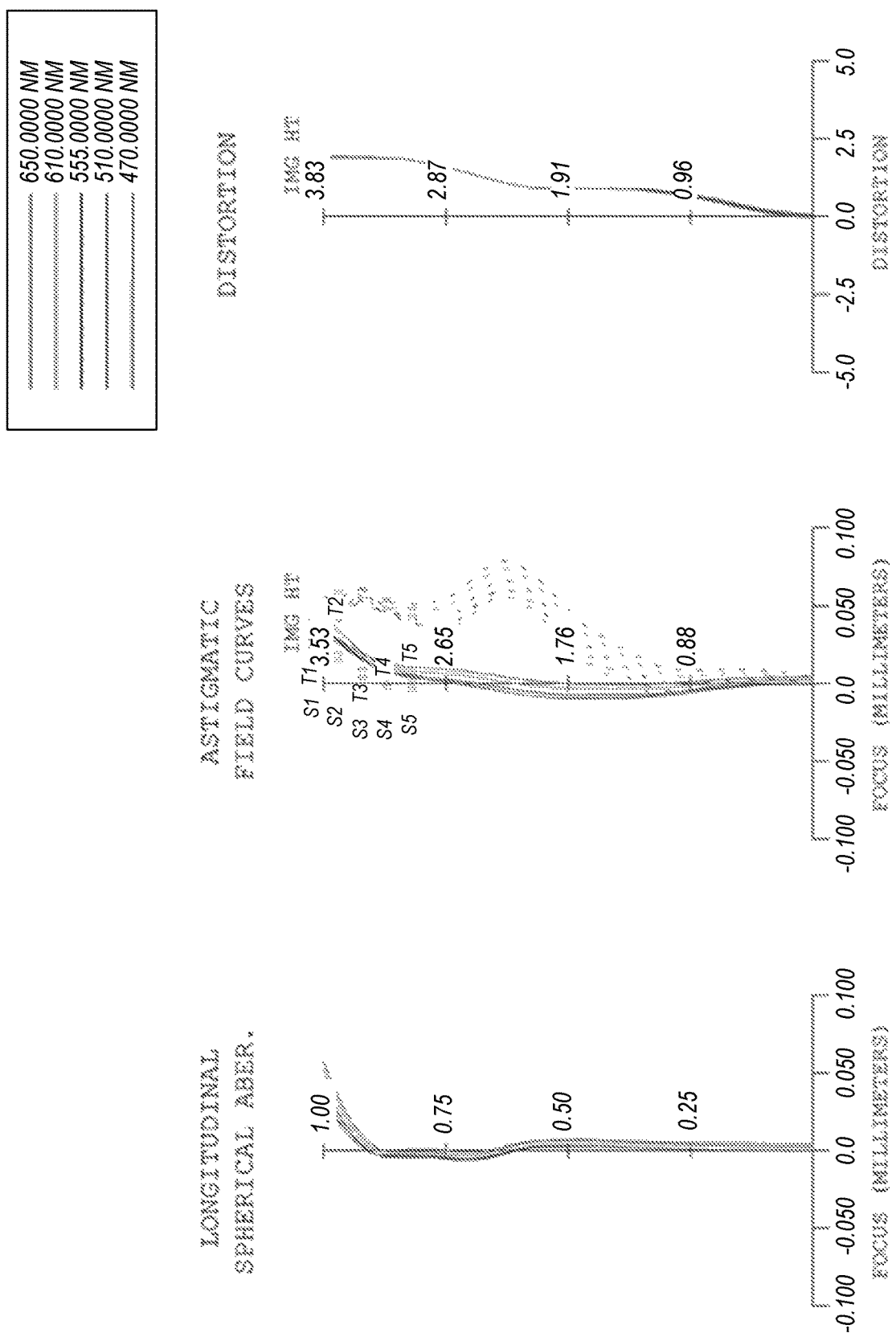
FIG. 5C shows the longitudinal spherical aberration, field curvature and distortion for a lens system as illustrated in FIG. 5A.

FIG. 5C shows the longitudinal spherical aberration, field curvature and distortion for a lens system 510 as illustrated in FIG. 5A, according to some embodiments. As shown in FIG. 5C, optical distortion across the field of view is controlled within 2.5%, while field curvature and astigmatism are well balanced across the field of view.

Lens System 610

Figure 6A:
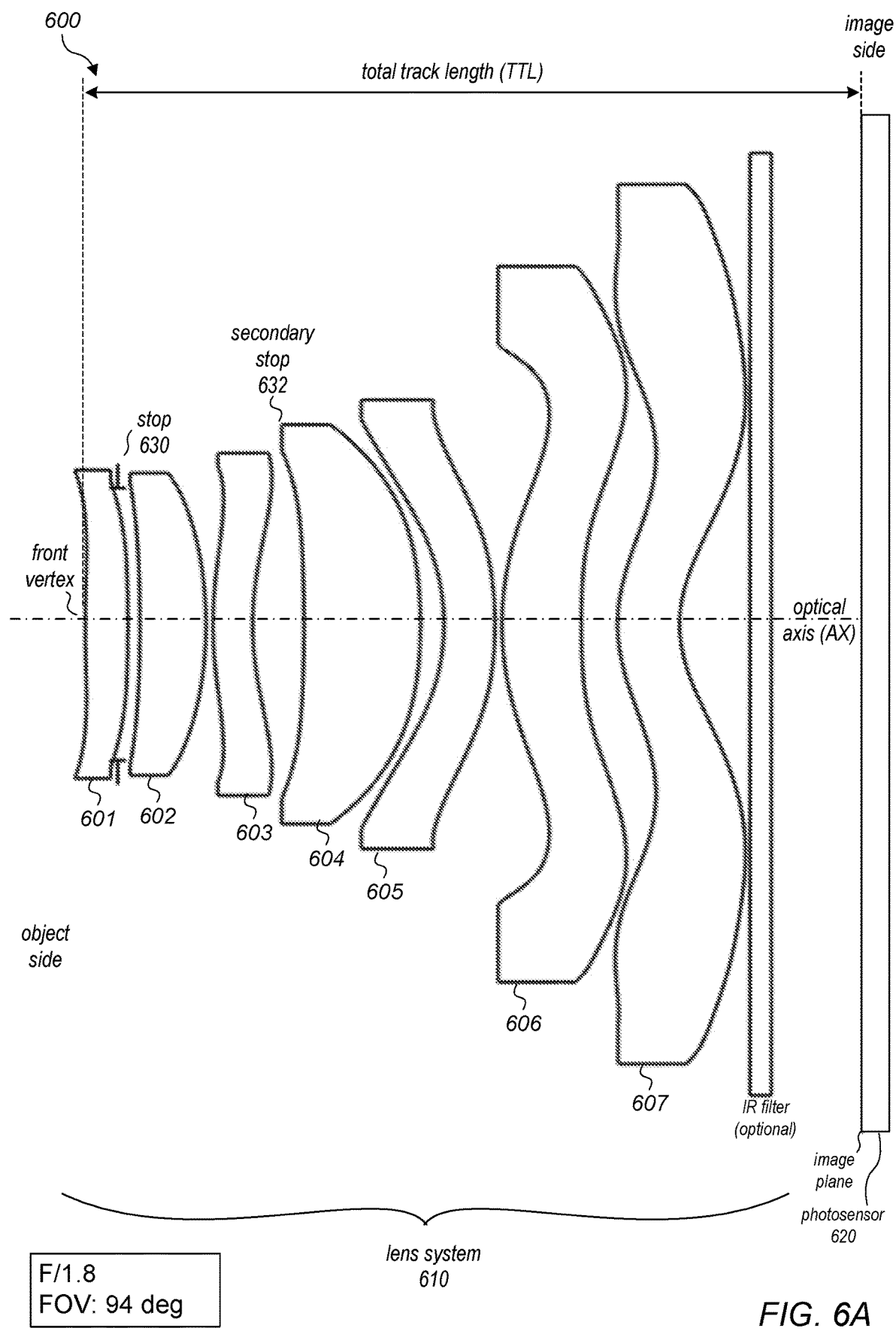
FIG. 6A is a cross-sectional illustration of a sixth embodiment of a lens system that includes seven lens elements.

FIG. 6A illustrates an example camera 600 with a lens system 610 that includes seven refractive lens elements, according to some embodiments. Tables 6A through 6F provide example values for various optical and physical parameters of camera 600 and lens system 610. Lens system 610 may include seven lens elements with refractive power, arranged along an optical axis AX in order from an object side to an image side:

a first lens element 601 with positive refractive power;
a second lens element 602 with positive refractive power;
a third lens element 603 with negative refractive power;
a fourth lens element 604 with positive refractive power;
a fifth lens element 605 with refractive power;
a sixth lens element 606 with positive refractive power; and
a seventh lens element 607 with refractive power.

As shown in FIG. 6A, lens system 610 system may include an aperture stop 630 at or near the image side surface of lens 601, and a secondary stop 632 at the object side surface of lens 604. The lens system 610 may be designed to compensate for loss of illumination and possible vignetting that may result from the internal stop 632. The camera 600 may include an IR filter located between lens element 607 and photosensor 620.

Lens system 610 may have an effective focal length f of 3.401, F-number of 1.79, and full field of view (FFOV) of 93.8 degrees. The relationship TTL/ImageH for lens system 610 is 1.534. Thus, assuming ImageH=4 mm, TTL of lens system 610 is about 6.136 mm. The relationship (Vd1+Vd3)/Vd2 for lens system 610 is 1.35. Vd6 for lens system

610 is 56.0. The relationship ($f_{system}/f12$) for lens system 610 is 0.811. The relationship $|f_{system}/f3|+|f_{system}/f5|$ for lens system 610 is 0.812. The relationship (R9+R10)/(R9−R10) for lens system 610 is −3.707.

Figure 6B:
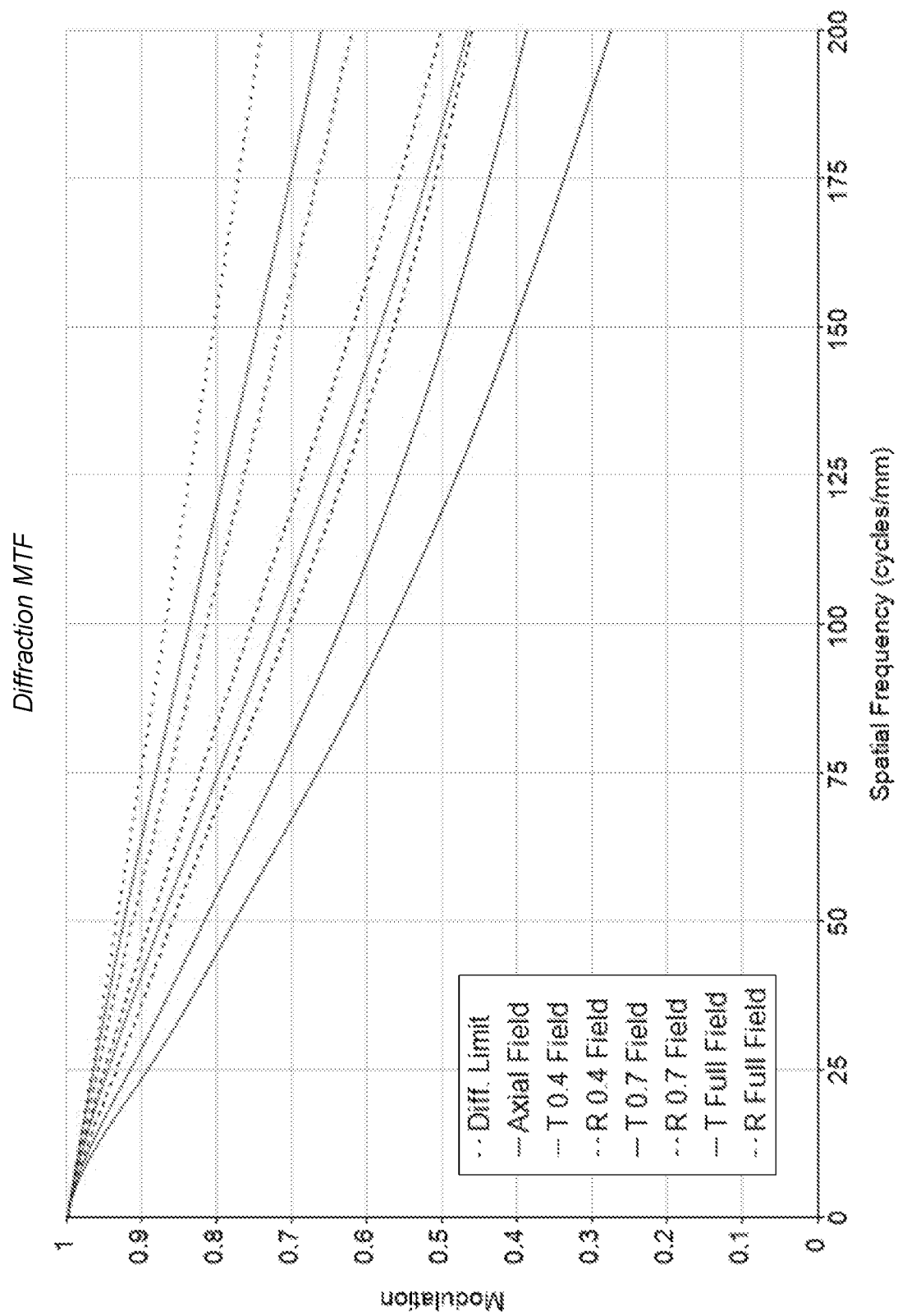
FIG. 6B is a graph illustrating the MTF for a lens system as illustrated in FIG. 6A.

FIG. 6B is a graph illustrating the modulation transfer function (MTF) for a lens system 610 as illustrated in FIG. 6A, according to some embodiments. FIG. 6B shows the lens MTF evaluated at 0 field, 0.4 field, 0.7 field and full field respectively. MTFs are higher than 0.5 at 100 line pairs (lp)/mm, showing good contrast for high-resolution imaging and rendering high-quality images using high-resolution sensors.

Figure 6C:
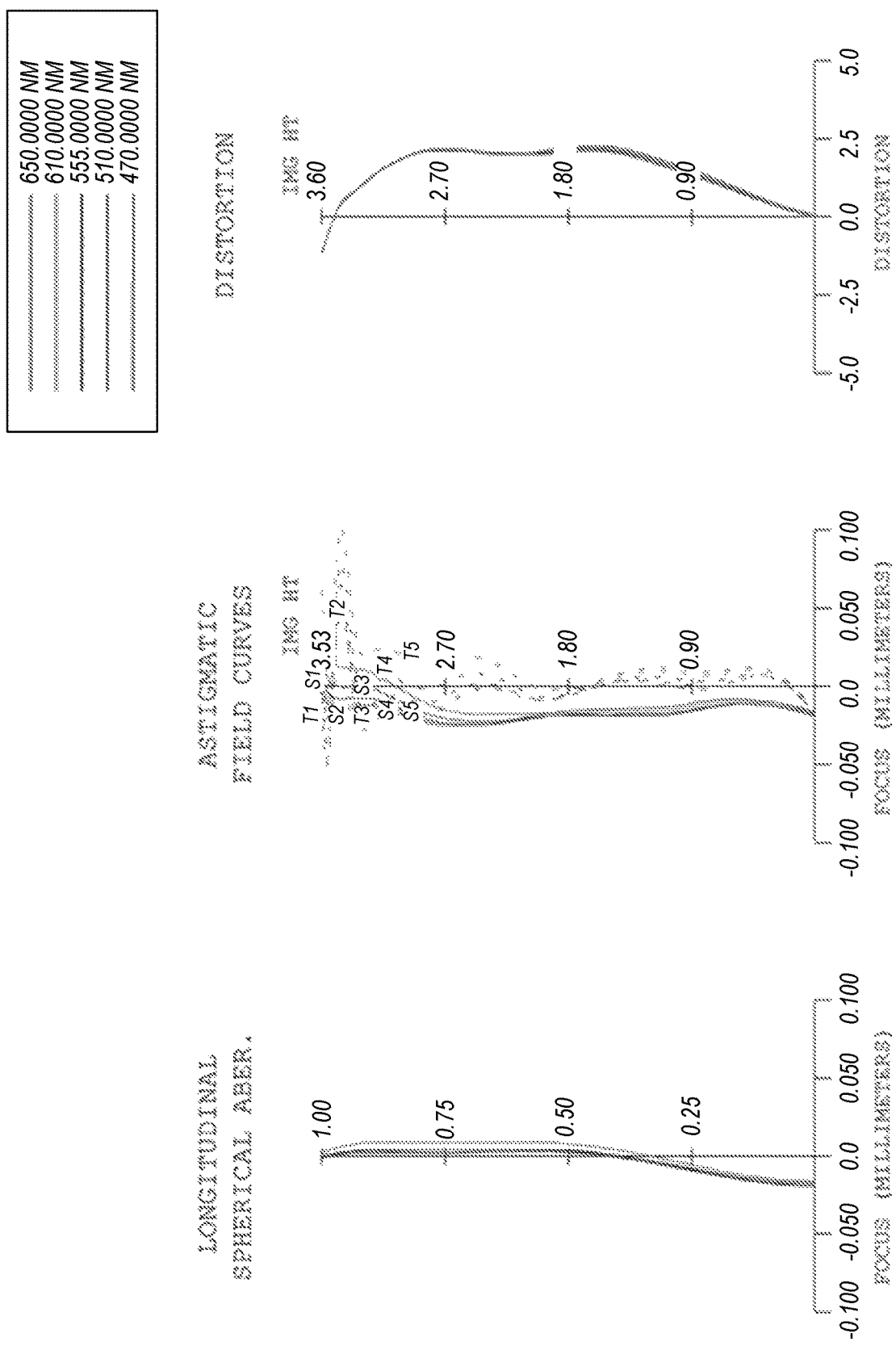
FIG. 6C shows the longitudinal spherical aberration, field curvature and distortion for a lens system as illustrated in FIG. 6A.

FIG. 6C shows the longitudinal spherical aberration, field curvature and distortion for a lens system 610 as illustrated in FIG. 6A, according to some embodiments. As shown in FIG. 6C, optical distortion across the field of view is controlled within 2.5%, while field curvature and astigmatism are well balanced across the field of view.

Lens System 710

Figure 7A:
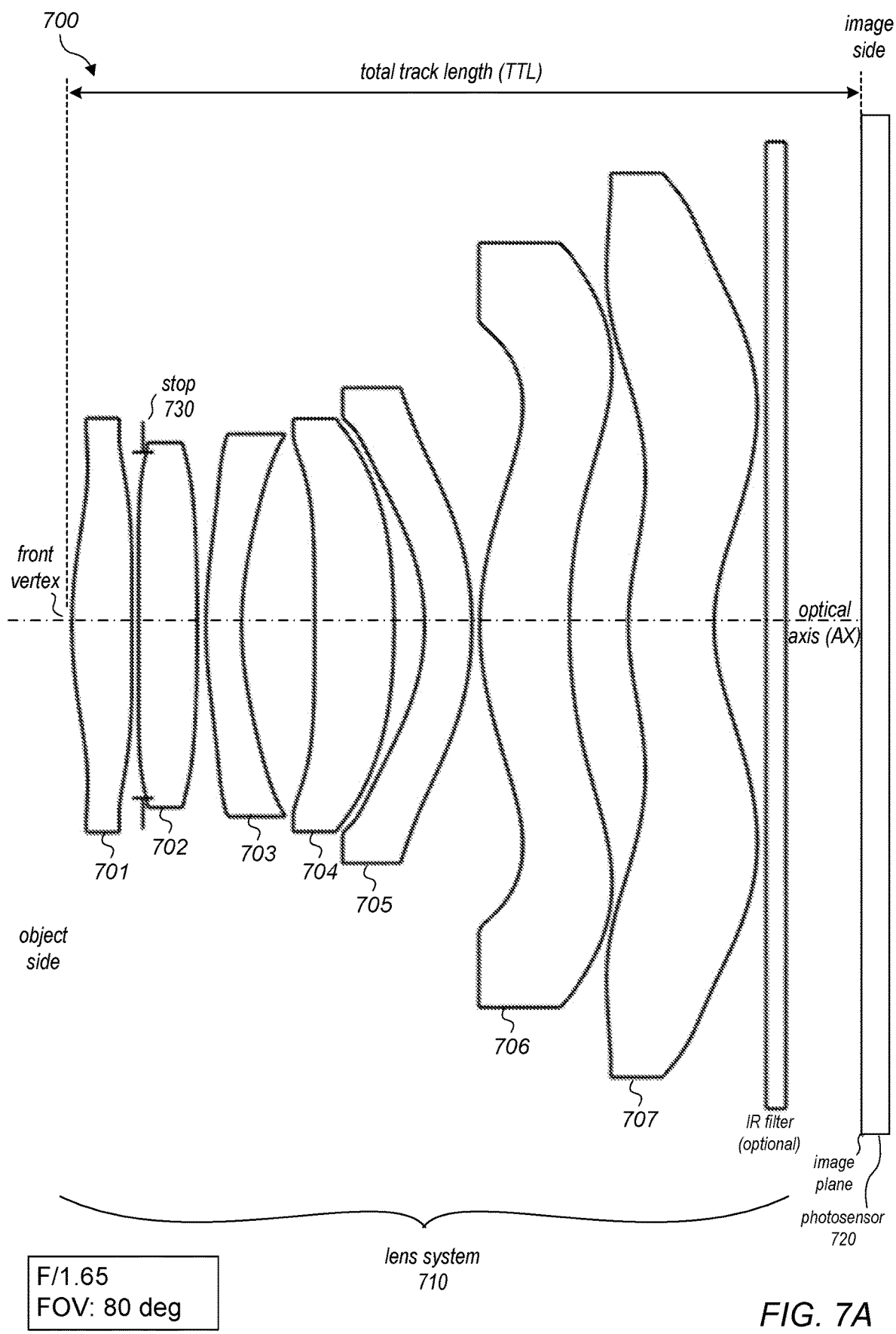
FIG. 7A is a cross-sectional illustration of a seventh embodiment of a lens system that includes seven lens elements.

FIG. 7A illustrates an example camera 700 with a lens system 710 that includes seven refractive lens elements, according to some embodiments. Tables 7A through 7F provide example values for various optical and physical parameters of camera 700 and lens system 710. Lens system 710 may include seven lens elements with refractive power, arranged along an optical axis AX in order from an object side to an image side:

a first lens element 701 with positive refractive power;
a second lens element 702 with positive refractive power;
a third lens element 703 with negative refractive power;
a fourth lens element 704 with positive refractive power;
a fifth lens element 705 with refractive power;
a sixth lens element 706 with positive refractive power; and
a seventh lens element 707 with refractive power.

As shown in FIG. 7A, lens system 710 system may include an aperture stop 730 between the image side surface of lens 701 and the object side surface of lens 702. Lens system 710 may not include a secondary stop.

Lens system 710 may have an effective focal length f of 4.361, F-number of 1.65, and full field of view (FFOV) of 80.3 degrees. The relationship TTL/ImageH for lens system 710 is 1.600. Thus, assuming ImageH=4 mm, TTL of lens system 710 is about 6.4 mm. The relationship (Vd1+Vd3)/Vd2 for lens system 710 is 1.34. Vd6 for lens system 710 is 56.0. The relationship ($f_{system}/f12$) for lens system 710 is 0.943. The relationship $|f_{system}/f3|+|f_{system}/f5|$ for lens system 710 is 0.868. The relationship (R9+R10)/(R9−R10) for lens system 710 is −4.540.

Figure 7B:
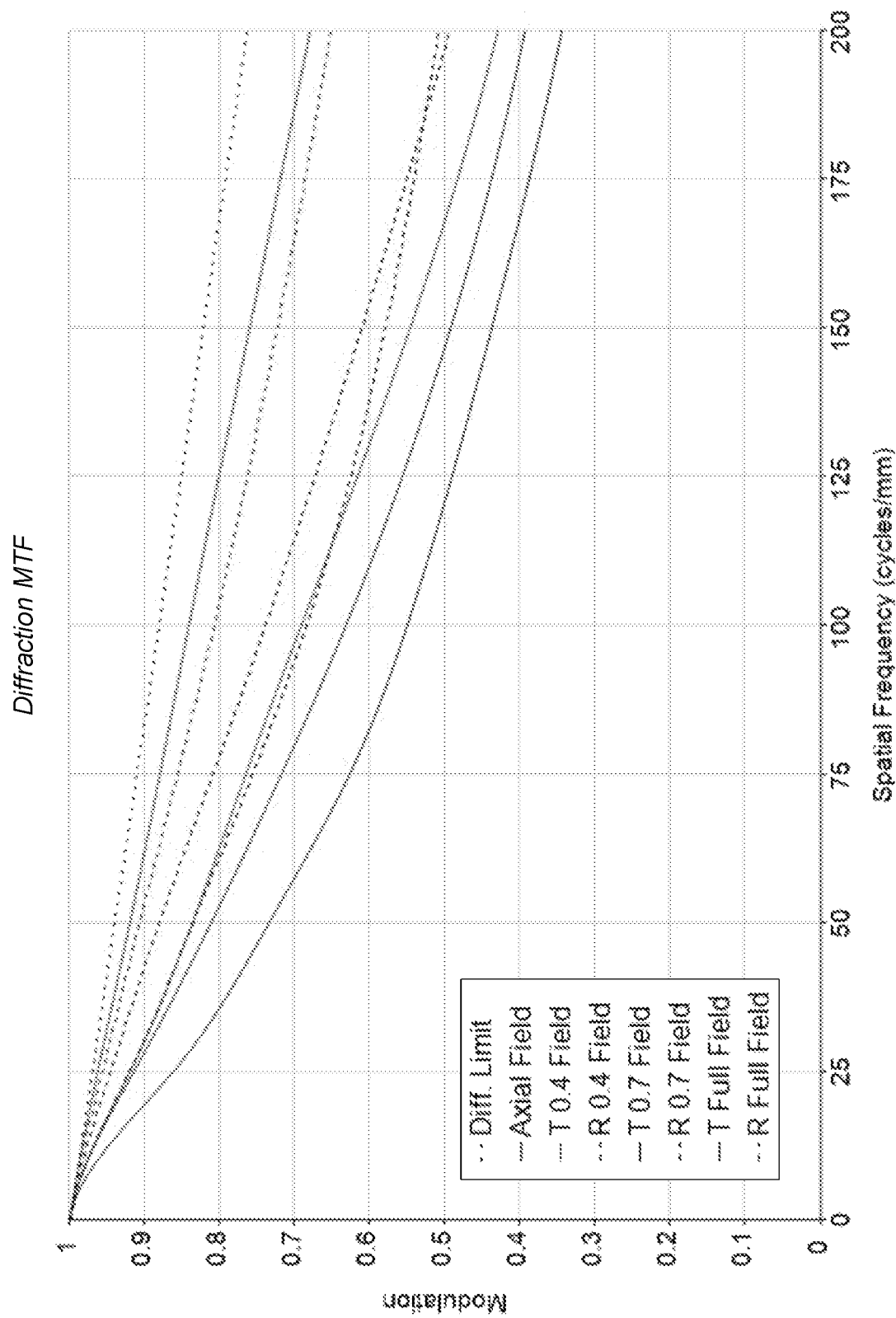
FIG. 7B is a graph illustrating the MTF for a lens system as illustrated in FIG. 7A.

FIG. 7B is a graph illustrating the modulation transfer function (MTF) for a lens system 710 as illustrated in FIG. 7A, according to some embodiments. FIG. 7B shows the lens MTF evaluated at 0 field, 0.4 field, 0.7 field and full field respectively. MTFs are higher than 0.5 at 100 line pairs (lp)/mm, showing good contrast for high-resolution imaging and rendering high-quality images using high-resolution sensors.

Figure 7C:
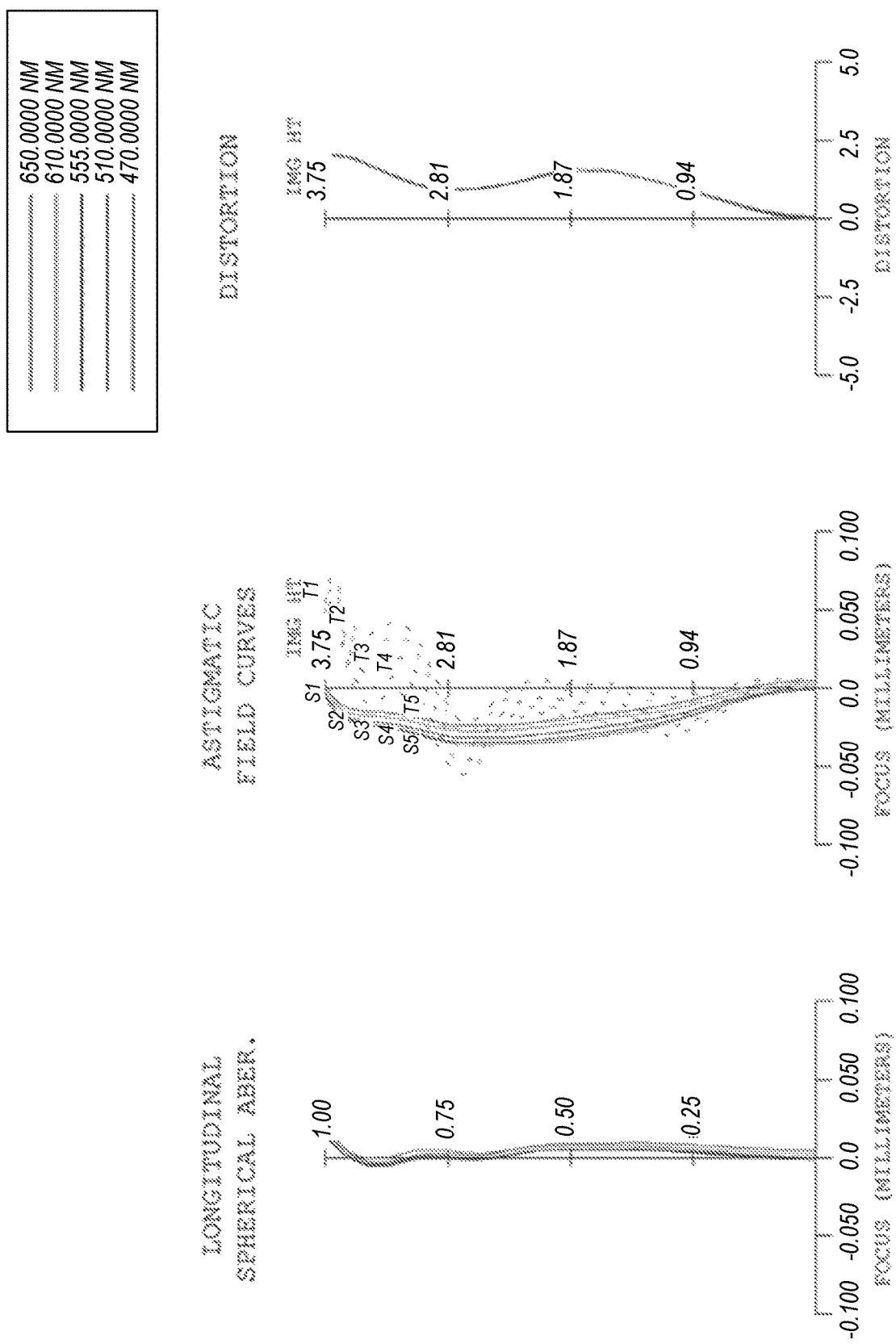
FIG. 7C shows the longitudinal spherical aberration, field curvature and distortion for a lens system as illustrated in FIG. 7A.

FIG. 7C shows the longitudinal spherical aberration, field curvature and distortion for a lens system 710 as illustrated in FIG. 7A, according to some embodiments.

As shown in FIG. 7C, optical distortion across the field of view is controlled within 2.5%, while field curvature and astigmatism are well balanced across the field of view.

Lens System 810

Figure 8A:
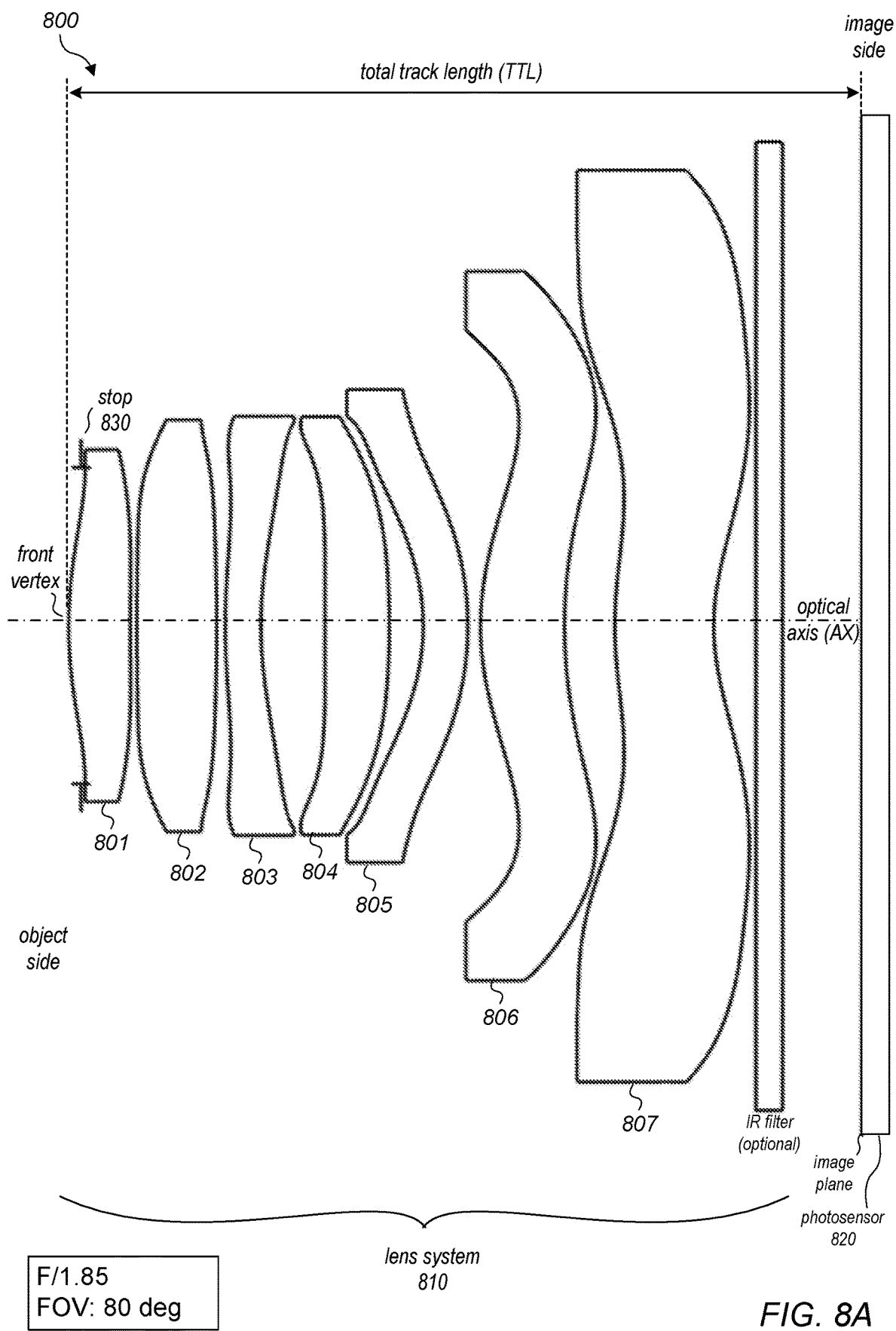
FIG. 8A is a cross-sectional illustration of an eighth embodiment of a lens system that includes seven lens elements.

FIG. 8A illustrates an example camera 800 with a lens system 810 that includes seven refractive lens elements, according to some embodiments. Tables 8A through 8F provide example values for various optical and physical parameters of camera 800 and lens system 810. Lens system 810 may include seven lens elements with refractive power, arranged along an optical axis AX in order from an object side to an image side:

a first lens element 801 with positive refractive power;
a second lens element 802 with positive refractive power;
a third lens element 803 with negative refractive power;
a fourth lens element 804 with positive refractive power;
a fifth lens element 805 with refractive power;
a sixth lens element 806 with positive refractive power; and
a seventh lens element 807 with refractive power.

As shown in FIG. 8A, lens system 810 system may include an aperture stop 830 at or near the object side surface of lens 801. Lens system 810 may not include a secondary stop.

Lens system 810 may have an effective focal length f of 4.431, F-number of 1.85, and full field of view (FFOV) of 79.7 degrees. The relationship TTL/ImageH for lens system 810 is 1.599. Thus, assuming ImageH=4 mm, TTL of lens system 810 is about 6.396 mm. The relationship (Vd1+Vd3)/Vd2 for lens system 810 is 1.34. Vd6 for lens system 810 is 56.0. The relationship ($f_{system}/f12$) for lens system 810 is 1.005. The relationship $|f_{system}/f3|+|f_{system}/f5|$ for lens system 810 is 0.844. The relationship (R9+R10)/(R9−R10) for lens system 810 is −5.516.

Figure 8B:
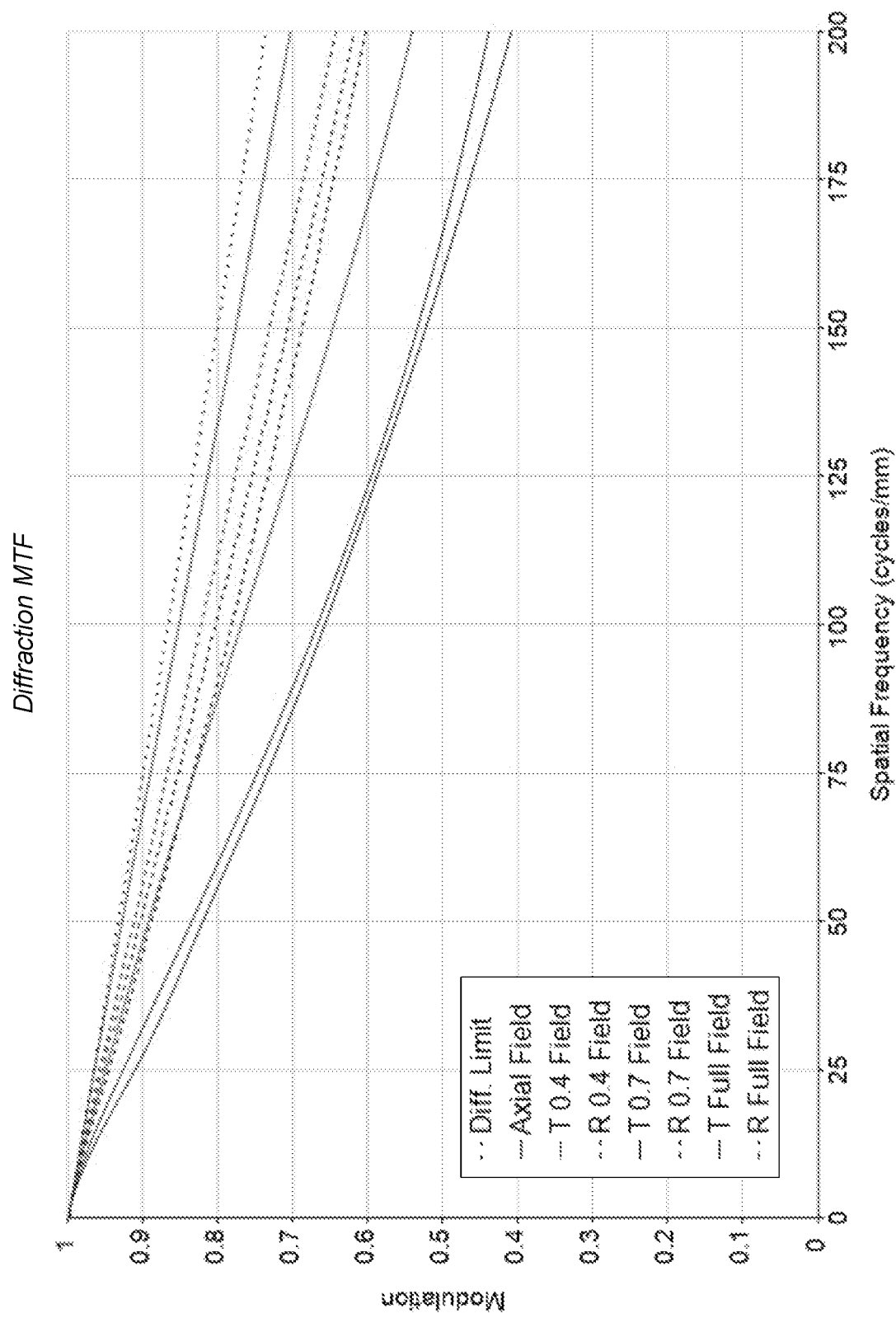
FIG. 8B is a graph illustrating the MTF for a lens system as illustrated in FIG. 8A.

FIG. 8B is a graph illustrating the modulation transfer function (MTF) for a lens system 810 as illustrated in FIG. 8A, according to some embodiments. FIG. 8B shows the lens MTF evaluated at 0 field, 0.4 field, 0.7 field and full field respectively. MTFs are higher than 0.5 at 100 line pairs (lp)/mm, showing good contrast for high-resolution imaging and rendering high-quality images using high-resolution sensors.

Figure 8C:
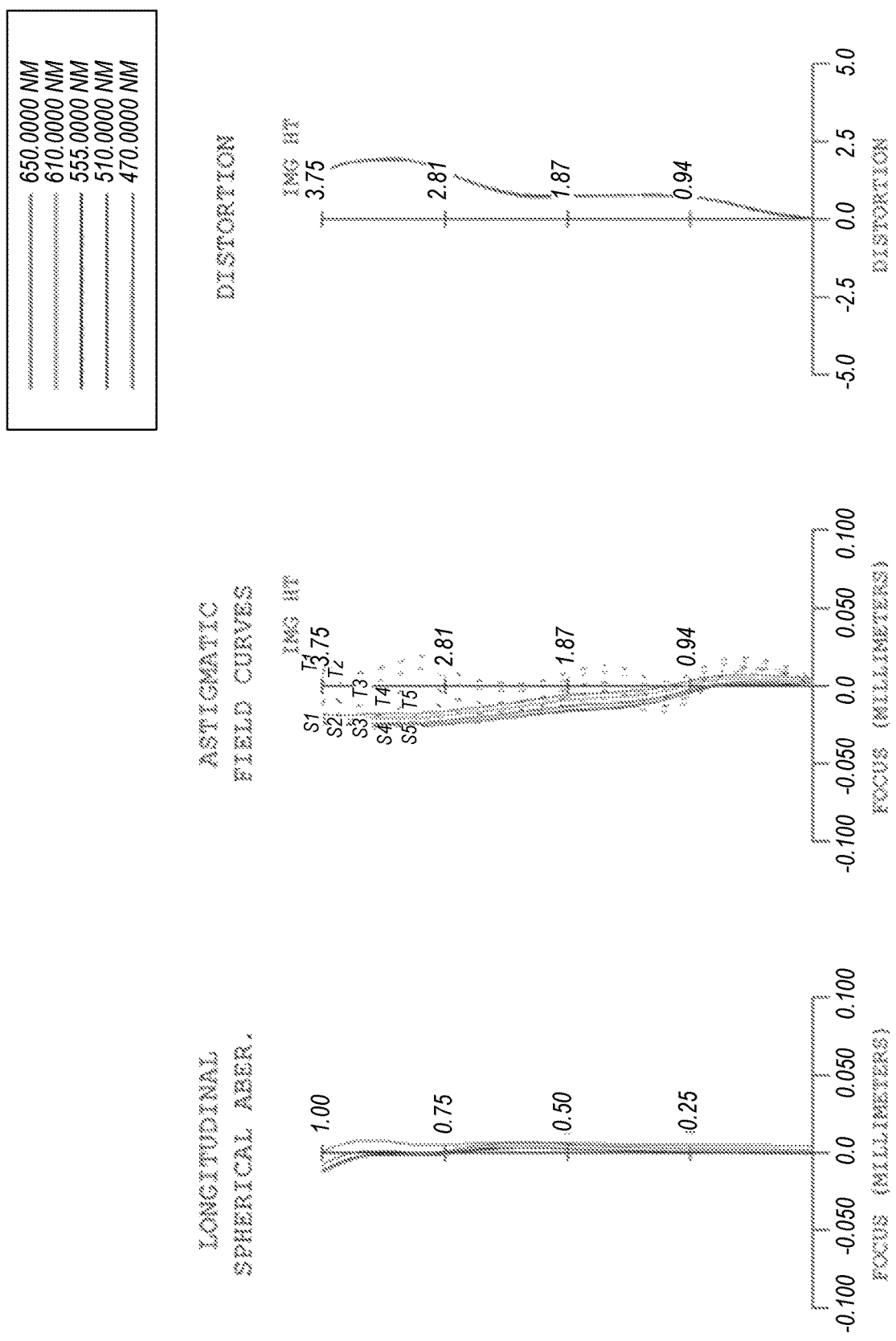
FIG. 8C shows the longitudinal spherical aberration, field curvature and distortion for a lens system as illustrated in FIG. 8A.

FIG. 8C shows the longitudinal spherical aberration, field curvature and distortion for a lens system 810 as illustrated in FIG. 8A, according to some embodiments. As shown in FIG. 8C, optical distortion across the field of view is controlled within 2.5%, while field curvature and astigmatism are well balanced across the field of view.

Figure 9:
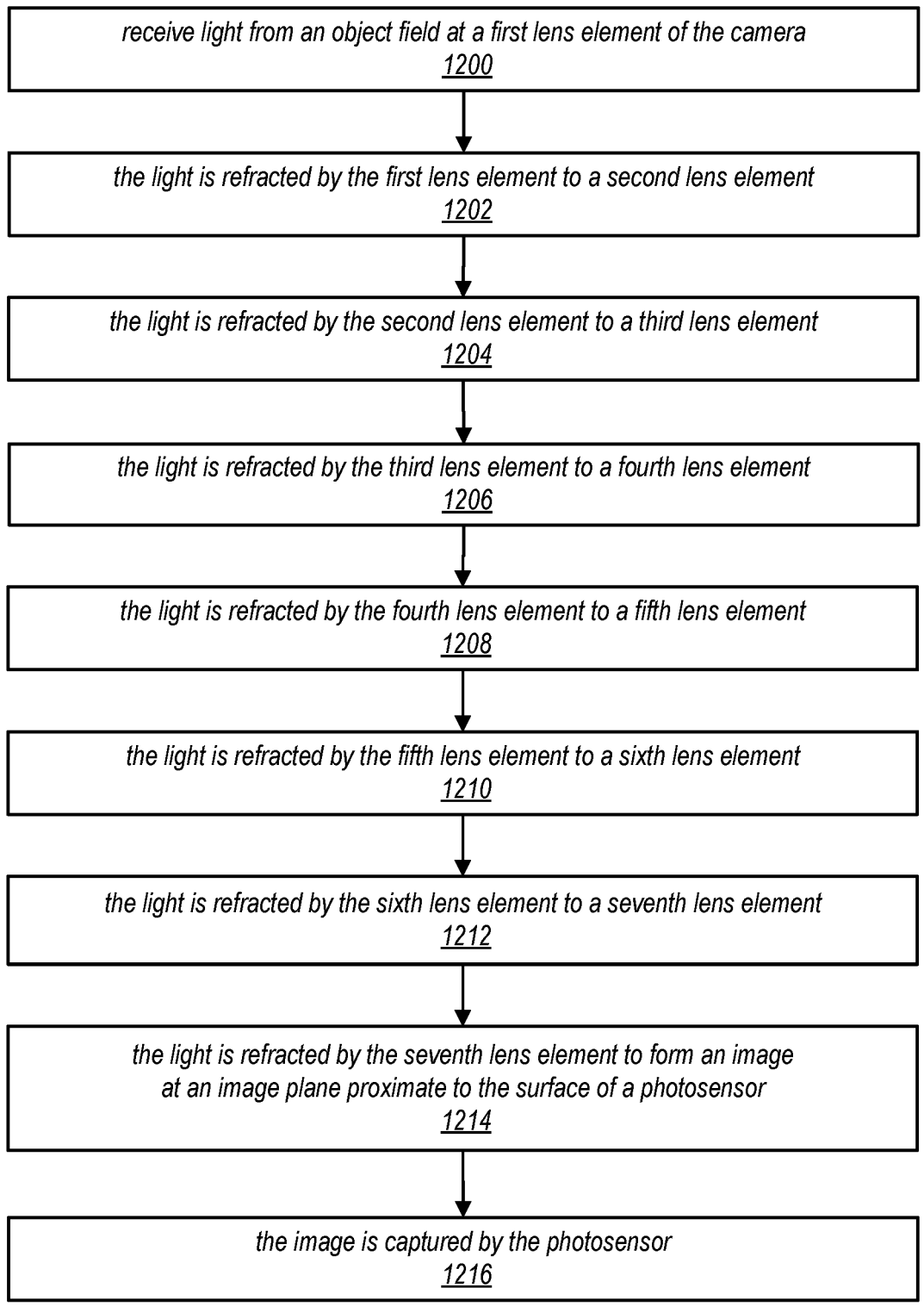
FIG. 9 is a flowchart of a method for capturing images using a camera as illustrated in FIGS. 1A through 8C, according to some embodiments.

FIG. 9 is a high-level flowchart of a method for capturing images using a camera with a lens system that includes seven lens elements as illustrated in any of FIGS. 1A, 2A, 3A, 4A, 5A, 6A, 7A, and 8A, according to some embodiments. As indicated at 1200, light from an object field in front of the camera is received at a first lens element of the camera. As indicated at 1202, the first lens element refracts the light to a second lens element. As indicated at 1204, the light is then refracted by the second lens element to a third lens element. As indicated at 1206, the light is then refracted by the third lens element to a fourth lens element. As indicated at 1208, the light is then refracted by the fourth lens element to a fifth lens element. As indicated at 1210, the light is then refracted by the fifth lens element to a sixth lens element. As indicated at 1212, the light is then refracted by the sixth lens element to a seventh lens element. As indicated at 1214, the light is refracted by the seventh lens element to form an image at an image plane at or near the surface of a photosensor. As indicated at 1216, the image is captured by the photosensor.

While not shown in FIG. 9, in some embodiments, the light may pass through an infrared filter that may for example be located between the seventh lens element and the photosensor. In some embodiments, an aperture stop may be located at the first lens element, and light from the object field may be received at the first lens element through the aperture stop. In some embodiments, the aperture stop may instead be located between the first and second lens elements, and light from the object field may be received at the first lens element of the camera and refracted through an aperture stop to the second lens element. In some embodiments, the lens system may also include one or more internal or secondary stops, for example a secondary stop located at the object side surface of the fourth lens element, or two secondary stops, with one located at the image side surface of the second lens element and one located at the image side surface of the fourth lens element.

In some embodiments, the seven lens elements referred to in FIG. 9 may be configured as illustrated in any of FIGS. 1A, 2A, 3A, 4A, 5A, 6A, 7A, and 8A and the corresponding Tables 1A-1F, 2A-2F, 3A-3F, 4A-4F, 5A-5F, 6A-6F, 7A-7F, and 8A-8F. However, note that variations on the examples given in the Figures and Tables are possible while achieving similar optical results.

Example Lens System Tables

The following Tables provide example values for various optical and physical parameters of the example embodiment of the lens system and cameras as described in reference to FIGS. 1A, 2A, 3A, 4A, 5A, 6A, 7A, and 8A. In the Tables, all dimensions are in millimeters (mm) unless otherwise specified. L1, L2, L3, L4, L5, L6, and L7 stand for refractive lenses 1, 2, 3, 4, 5, 6, and 7, respectively. STOP stands for the camera aperture stop, and (ape) signifies a secondary stop. Object indicates the object plane, IRCF or filter indicates an infrared filter, and sensor indicates the camera photosensor. "S#" stands for surface number. The surface numbers (S#) of the elements as shown in the Tables are listed from a first surface 0 at the object plane to a last surface at the image plane/photosensor surface. A positive radius for a surface indicates that the center of curvature is to the right (object side) of the surface. A negative radius indicates that the center of curvature is to the left (image side) of the surface. "INF" stands for infinity (as used in optics). The thickness (or separation) is the axial distance to the next surface. FNO stands for F-number of the lens system. FFOV stands for full field of view. $f_{35mm}$ is the 35 mm equivalent focal length of the lens system. $V_x$ is the Abbe number of a respective lens element. Both f and $f_{sys}$ stand for the effective focal length of the lens system, f12 is the composite focal length of the first and second lens elements, f3 is effective focal length of the third lens element, f5 is effective focal length of the fifth lens element, R9 is radius of curvature of the object side surface of the fifth lens element, R10 is radius of curvature of the image side surface of the fifth lens element, and Vd1, Vd2, Vd3, and Vd6 are the Abbe numbers of the first, second, third, and sixth lens elements, respectively. TTL is total track length of the lens system focusing at infinity conjugate and may be measured between the object side surface of lens 1 or the aperture stop, whichever comes closer to the object, to the image plane. ImaH is the semi-diagonal image height on the image plane.

For the materials of the lens elements and IR filter, a refractive index $N_d$ at the helium d-line wavelength is provided, as well as an Abbe number $V_d$ relative to the d-line and the C- and F-lines of hydrogen. The Abbe number, $V_d$, may be defined by the equation:

$$V_d = (N_d - 1)/(N_F - N_C),$$

where $N_F$ and $N_C$ are the refractive index values of the material at the F and C lines of hydrogen, respectively.

Referring to the Tables of aspheric coefficients, the aspheric equation describing an aspherical surface may be given by:

$$Z = (cr^2/(1+\text{sqrt}[1-(1+K)c^2r^2])) + A_4 r^4 + A_6 r^6 + A_8 r^8 + A_{10} r^{10} + A_{14} r^{14} + A_{16} r^{16} + A_{18} r^{18} + A_{20} r^{20}$$

where Z is the sag of surface parallel to the z-axis (the z-axis and the optical axis are coincident in these example embodiments), r is the radial distance from the vertex, c is the curvature at the pole or vertex of the surface (the reciprocal of the radius of curvature of the surface), K is the conic constant, and $A_4$-$A_{20}$ are the aspheric coefficients. In the Tables, "E" denotes the exponential notation (powers of 10).

Note that the values given in the following Tables for the various parameters in the various embodiments of the lens system are given by way of example and are not intended to be limiting. For example, one or more of the parameters for one or more of the surfaces of one or more of the lens elements in the example embodiments, as well as parameters for the materials of which the elements are composed, may be given different values while still providing similar performance for the lens system. In particular, note that some values in the Tables may be scaled up or down for larger or smaller implementations of a camera using an embodiment of a lens system as described herein.

TABLE 1A (Lens system 110)
Lens system 110
Fno = 1.7, FFOV = 76.7 deg

| Element | Surface # | Radius (mm) | Thickness or separation (mm) | Refractive Index $N_d$ | Abbe Number $V_d$ |
|---|---|---|---|---|---|
| Object | 0 | Inf | Inf | | |
| Stop | 1 | Inf | −0.445 | | |
| L1 | *2 | 2.304 | 0.783 | 1.545 | 56.0 |
| | *3 | 88.900 | 0.040 | | |
| L2 (ape) | *4 | 3.841 | 0.230 | 1.608 | 26.9 |
| | *5 | 2.195 | 0.466 | | |
| L3 | *6 | 18.743 | 0.231 | 1.671 | 19.5 |
| | *7 | 8.569 | 0.238 | | |
| L4 (ape) | *8 | 16.112 | 0.606 | 1.545 | 56.0 |
| | *9 | −4.953 | 0.404 | | |
| L5 | *10 | −1.217 | 0.370 | 1.608 | 26.9 |
| | *11 | −1.845 | 0.040 | | |
| L6 | *12 | 1.562 | 0.498 | 1.545 | 56.0 |
| | *13 | 3.300 | 1.049 | | |
| L7 | *14 | −4.722 | 0.380 | 1.509 | 56.5 |
| | *15 | 6.051 | 0.300 | | |
| IRCF | 16 | Inf | 0.210 | 1.517 | 64.2 |
| | 17 | Inf | 0.448 | | |
| Sensor | 18 | 0 | 0 | | |

*Annotates aspheric surfaces (aspheric coefficients given in Tables 1B-1E)

TABLE 1B

Aspheric Coefficients (Lens System 110)

| | Surface (S#) | | | |
|---|---|---|---|---|
| | S2 | S3 | S4 | S5 |
| K | −3.05320E−01 | 5.81709E+01 | −5.91105E+00 | −5.82023E+00 |
| A4 | 6.03196E−04 | −4.25193E−02 | −1.00340E−01 | −1.86991E−02 |
| A6 | 6.34230E−03 | 6.59107E−02 | 1.19187E−01 | 3.47875E−02 |
| A8 | −9.72174E−03 | −5.91249E−02 | −9.27288E−02 | −3.37461E−02 |
| A10 | 6.11484E−03 | 2.82565E−02 | 5.10058E−02 | 2.50671E−02 |
| A12 | −2.26515E−03 | −7.21506E−03 | −1.59579E−02 | −1.12741E−02 |
| A14 | 2.21091E−04 | 7.15565E−04 | 2.43034E−03 | 2.02348E−03 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 1C

Aspheric Coefficients (Lens System 110)

| | Surface (S#) | | | |
|---|---|---|---|---|
| | S6 | S7 | S8 | S9 |
| K | −9.90000E+01 | −6.73586E+01 | −3.42875E+01 | −8.83380E−01 |
| A4 | −4.31764E−02 | −3.39999E−02 | −5.79503E−02 | −5.18251E−02 |
| A6 | 2.02107E−02 | 2.82806E−02 | 5.21786E−02 | 3.59111E−02 |
| A8 | −7.78648E−02 | −6.25213E−02 | −6.55491E−02 | −5.04804E−02 |
| A10 | 7.66115E−02 | 5.70290E−02 | 5.21580E−02 | 4.32790E−02 |
| A12 | −3.84784E−02 | −2.33303E−02 | −1.86763E−02 | −1.50636E−02 |
| A14 | 7.77245E−03 | 3.93678E−03 | 2.41644E−03 | 1.81523E−03 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 1D

Aspheric Coefficients (Lens System 110)

| | Surface (S#) | | | |
|---|---|---|---|---|
| | S10 | S11 | S12 | S13 |
| K | −5.26250E+00 | −8.26180E−01 | −7.07080E+00 | −6.65914E+00 |
| A4 | −2.09645E−02 | 4.59461E−02 | 2.55357E−02 | 2.76443E−02 |
| A6 | −3.17745E−02 | −6.11074E−02 | −3.47440E−02 | −3.96580E−02 |
| A8 | 2.74893E−02 | 5.30175E−02 | 1.40896E−02 | 1.66250E−02 |
| A10 | 3.91643E−03 | −2.35045E−02 | −3.25680E−03 | −3.96122E−03 |
| A12 | −7.41082E−03 | 6.02808E−03 | 3.70484E−04 | 5.50090E−04 |
| A14 | 2.07046E−03 | −8.14669E−04 | −1.55394E−05 | −4.11444E−05 |
| A16 | −1.84476E−04 | 4.37640E−05 | −2.74692E−08 | 1.27412E−06 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 1E

Aspheric Coefficients (Lens System 110)

| | Surface (S#) | |
|---|---|---|
| | S14 | S15 |
| K | −1.25036E+01 | 2.04150E−01 |
| A4 | −7.53149E−02 | −6.62641E−02 |
| A6 | 7.20264E−03 | 9.96535E−03 |
| A8 | 4.36238E−03 | 7.56385E−04 |
| A10 | −1.24385E−03 | −4.48416E−04 |
| A12 | 1.39735E−04 | 5.79979E−05 |
| A14 | −7.44489E−06 | −3.22535E−06 |
| A16 | 1.54848E−07 | 6.69547E−08 |
| A18 | 0.00000E+00 | 0.00000E+00 |
| A20 | 0.00000E+00 | 0.00000E+00 |

TABLE 1F

Optical Definitions (Lens system 110)

| | | | |
|---|---|---|---|
| f [mm] | 4.966 | Vd6 | 56.0 |
| FNO | 1.7 | fsys/fl2 | 0.707 |
| FFOV [deg] | 76.7° | |fsys/f3| + |fsys/f5| | 0.871 |
| TTL/ImaH | 1.57 | (R9 + R10)/(R9 − R10) | −4.876 |
| (Vd1 + Vd3)/Vd2 | 2.804 | | |

TABLE 2A (Lens system 210)
Lens system 210
Fno = 1.6, FFOV = 81.7 deg

| Element | Surface # | Radius (mm) | Thickness or separation (mm) | Refractive Index $N_d$ | Abbe Number $V_d$ |
|---|---|---|---|---|---|
| Object | 0 | Inf | Inf | | |
| L1 | *1 | 3.578 | 0.483 | 1.678 | 55.3 |
| | *2 | 52.982 | 0.043 | | |
| Stop | 3 | Inf | 0.120 | | |
| L2 | *4 | 145.648 | 0.523 | 1.545 | 56.0 |
| | *5 | −14.715 | 0.050 | | |
| L3 | *6 | 4.593 | 0.280 | 1.671 | 19.5 |
| | *7 | 2.864 | 0.698 | | |
| L4(ape) | *8 | 99.332 | 0.648 | 1.545 | 56.0 |
| | *9 | −7.970 | 0.275 | | |
| L5 | *10 | −1.782 | 0.349 | 1.671 | 19.5 |
| | *11 | −2.394 | 0.050 | | |
| L6 | *12 | 2.262 | 0.592 | 1.545 | 56.0 |
| | *13 | 3.608 | 0.554 | | |
| L7 | *14 | 2.166 | 0.606 | 1.545 | 56.0 |
| | *15 | 1.490 | 0.371 | | |
| Filter | 16 | Inf | 0.200 | 1.517 | 64.2 |
| | 17 | Inf | 0.600 | | |
| Sensor | 18 | Inf | 0.000 | | |

*Annotates aspheric surfaces (aspheric coefficients given in Tables 2B-2E)

TABLE 2B

Aspheric Coefficients (Lens System 210)

| | Surface (S#) | | | |
|---|---|---|---|---|
| | S1 | S2 | S4 | S5 |
| K | 0.00000E+00 | 0.00000E+00 | 0.00000E+00 | 0.00000E+00 |
| A4 | −2.71282E−02 | −5.23273E−02 | −1.64596E−02 | −1.20496E−02 |
| A6 | 8.16881E−04 | −1.09116E−03 | −1.49108E−02 | 6.89812E−04 |
| A8 | −1.57489E−02 | 1.61222E−02 | 4.70541E−02 | −7.05934E−03 |
| A10 | 7.79285E−03 | −8.29321E−03 | −2.82823E−02 | 3.00405E−03 |
| A12 | −9.83834E−04 | 1.58985E−03 | 6.28593E−03 | −5.47500E−04 |
| A14 | 0.00000E+00 | 0.00000E+00 | −4.08275E−04 | 4.45386E−05 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 2C

Aspheric Coefficients (Lens System 210)

| | Surface (S#) | | | |
|---|---|---|---|---|
| | S6 | S7 | S8 | S9 |
| K | 0.00000E+00 | 0.00000E+00 | 0.00000E+00 | 0.00000E+00 |
| A4 | −6.43880E−02 | −5.64974E−02 | −3.26388E−02 | −7.19908E−02 |
| A6 | 3.83174E−02 | 4.07390E−02 | −2.27384E−03 | 3.55925E−02 |
| A8 | −1.74126E−02 | −2.08857E−02 | −4.62563E−03 | −4.01549E−02 |
| A10 | 7.67743E−03 | 1.11914E−02 | 3.95460E−03 | 2.77583E−02 |
| A12 | −1.44363E−03 | −3.42685E−03 | −2.15521E−03 | −8.87713E−03 |
| A14 | 6.58250E−05 | 5.04322E−04 | 5.80626E−04 | 1.01358E−03 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 2D

Aspheric Coefficients (Lens System 210)

| | Surface (S#) | | | |
|---|---|---|---|---|
| | S10 | S11 | S12 | S13 |
| K | 0.00000E+00 | 0.00000E+00 | −1.00000E+00 | 0.00000E+00 |
| A4 | −3.98488E−03 | −3.31090E−02 | −1.53803E−02 | 3.30002E−02 |
| A6 | 7.45794E−02 | 5.20492E−02 | −9.40289E−03 | −2.88821E−02 |
| A8 | −9.46661E−02 | −5.34014E−02 | 2.51963E−03 | 7.89116E−03 |
| A10 | 7.78882E−02 | 4.27456E−02 | −6.01357E−04 | −1.40434E−03 |
| A12 | −3.36808E−02 | −2.10036E−02 | 7.92489E−05 | 1.55224E−04 |
| A14 | 7.33848E−03 | 6.06106E−03 | −4.67992E−06 | −9.20854E−06 |
| A16 | −6.48765E−04 | −9.52611E−04 | 1.10339E−07 | 2.17414E−07 |
| A18 | 0.00000E+00 | 6.30441E−05 | 0.00000E+00 | 0.00000E+00 |
| A20 | 0.00000E+00 | 0.00000E+00 | 0.00000E+00 | 0.00000E+00 |

TABLE 2E

Aspheric Coefficients (Lens System 210)

| | Surface (S#) | |
|---|---|---|
| | S14 | S15 |
| K | −1.00000E+00 | −1.00000E+00 |
| A4 | −1.40707E−01 | −1.49167E−01 |
| A6 | 2.67349E−02 | 4.41248E−02 |
| A8 | −2.02152E−03 | −1.04189E−02 |
| A10 | −1.06561E−05 | 1.72727E−03 |
| A12 | 1.20801E−05 | −1.83282E−04 |
| A14 | −7.51427E−07 | 1.16981E−05 |
| A16 | 1.52768E−08 | −4.07483E−07 |
| A18 | 0.00000E+00 | 5.94083E−09 |
| A20 | 0.00000E+00 | 0.00000E+00 |

TABLE 2F

Optical Definitions (Lens system 210)

| f [mm] | 4.672 | $V_{d6}$ | 56.0 |
|---|---|---|---|
| FNO | 1.6 | fsys/f2 | 0.999 |
| FFOV [deg] | 81.7° | \|fsys/f3\| + \|fsys/f5\| | 0.738 |
| TTL/ImaH | 1.584 | (R9 + R10)/(R9 − R10) | −6.824 |
| (Vd1 + Vd3)/Vd2 | 1.34 | | |

TABLE 3A (Lens system 310)
Lens system 310
Fno = 1.7, FFOV = 81.1 deg

| Element | Surface # | Radius (mm) | Thickness or separation (mm) | Refractive Index $N_d$ | Abbe Number $V_d$ |
|---|---|---|---|---|---|
| Object | 0 | Inf | Inf | | |
| L1 | *1 | 3.193 | 0.411 | 1.678 | 55.3 |
| | *2 | 7.332 | −0.111 | | |
| Stop | 3 | Inf | 0.218 | | |
| L2 | *4 | 4.279 | 0.580 | 1.545 | 56.0 |
| | *5 | −9.522 | 0.050 | | |
| L3 | *6 | 5.775 | 0.270 | 1.661 | 20.4 |
| | *7 | 2.841 | 0.424 | | |
| L4(ape) | *8 | −69.948 | 0.524 | 1.545 | 56.0 |
| | *9 | −6.479 | 0.233 | | |
| L5 | *10 | −1.824 | 0.300 | 1.661 | 20.4 |
| | *11 | −2.446 | 0.050 | | |
| L6 | *12 | 2.100 | 0.633 | 1.545 | 56.0 |
| | *13 | 2.697 | 0.365 | | |
| L7 | *14 | 1.941 | 0.555 | 1.545 | 56.0 |
| | *15 | 1.331 | 0.298 | | |
| Filter | 16 | Inf | 0.200 | 1.517 | 64.2 |
| | 17 | Inf | 0.600 | | |
| Sensor | 18 | Inf | 0 | | |

*Annotates aspheric surfaces (aspheric coefficients given in Tables 3B-3E)

TABLE 3B

Aspheric Coefficients (Lens System 310)

| | Surface (S#) | | | |
|---|---|---|---|---|
| | S1 | S2 | S4 | S5 |
| K | 0.00000E+00 | 0.00000E+00 | 0.00000E+00 | 0.00000E+00 |
| A4 | −6.58554E−02 | −1.36833E−01 | −7.13044E−02 | −1.72276E−02 |
| A6 | 1.74384E−02 | 3.63225E−03 | −1.26558E−02 | −1.08422E−02 |
| A8 | −6.82517E−02 | 3.87808E−02 | 9.76565E−03 | 5.06073E−03 |
| A10 | 5.26960E−02 | −2.38248E−02 | −7.43276E−02 | −1.70027E−04 |
| A12 | −1.78190E−02 | 4.71206E−03 | 2.36292E−03 | −1.27495E−03 |
| A14 | 2.43257E−03 | 0.00000E+00 | −3.46406E−03 | 4.44916E−05 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 3C

Aspheric Coefficients (Lens System 310)

| | Surface (S#) | | | |
|---|---|---|---|---|
| | S6 | S7 | S8 | S9 |
| K | 0.00000E+00 | 0.00000E+00 | 0.00000E+00 | 0.00000E+00 |
| A4 | −7.20658E−02 | −7.43458E−02 | −4.18224E−02 | −9.43632E−02 |
| A6 | 1.34562E−02 | 3.54564E−02 | 2.91573E−03 | 8.48390E−02 |
| A8 | −8.11394E−03 | −4.69230E−02 | −1.13379E−02 | −1.11897E−01 |
| A10 | 5.22935E−03 | 4.15968E−02 | −5.92143E−03 | 8.79651E−02 |
| A12 | 2.69362E−03 | −1.84051E−02 | 5.58574E−03 | −3.74362E−02 |
| A14 | −1.82612E−03 | 3.45904E−03 | 7.34867E−05 | 6.13431E−03 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 3D

Aspheric Coefficients (Lens System 310)

| | Surface (S#) | | | |
|---|---|---|---|---|
| | S10 | S11 | S12 | S13 |
| K | 0.00000E+00 | 0.00000E+00 | 0.00000E+00 | 0.00000E+00 |
| A4 | 3.28957E−02 | −1.40719E−01 | −6.96766E−02 | −3.86811E−03 |
| A6 | 7.71349E−02 | −2.15278E−03 | −5.50187E−02 | −3.33070E−02 |
| A8 | −1.76369E−01 | 2.01486E−02 | 6.83074E−02 | 1.13522E−02 |
| A10 | 2.05715E−01 | −1.68369E−02 | −5.66557E−02 | −1.86911E−03 |
| A12 | −1.23173E−01 | 1.34296E−02 | 2.64327E−02 | 5.26583E−05 |
| A14 | 3.66992E−02 | −6.46473E−03 | −6.59686E−03 | 2.38391E−06 |
| A16 | −4.73956E−03 | 1.14035E−03 | 6.69854E−04 | −2.19638E−05 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 3E

Aspheric Coefficients (Lens System 310)

| | Surface (S#) | |
|---|---|---|
| | S14 | S15 |
| K | −1.00000E+00 | −1.00000E+00 |
| A4 | −2.46059E−01 | −2.48564E−01 |
| A6 | 8.79845E−02 | 1.12006E−01 |
| A8 | −1.77438E−02 | −3.95552E−02 |
| A10 | 2.19122E−03 | 9.55319E−03 |
| A12 | −1.61012E−04 | −1.45744E−03 |
| A14 | 6.26070E−06 | 1.33290E−04 |
| A16 | −9.39698E−08 | −6.66546E−06 |
| A18 | 0.00000E+00 | 1.40103E−07 |
| A20 | 0.00000E+00 | 0.00000E+00 |

TABLE 3F

Optical Definitions (Lens system 310)

| | | | |
|---|---|---|---|
| f[mm] | 4.170 | Vd6 | 56.0 |
| Fno | 1.7 | fsys/f12 | 1.125 |
| FFOV [deg] | 81.1° | \|fsys/f3\| + \|fsys/f5\| | 0.792 |
| TTL/ImaH | 1.587 | (R9 + R10)/(R9 − R10) | −6.865 |
| (Vd1 + Vd3)/Vd2 | 1.36 | | |

TABLE 4A (Lens system 410)
Lens system 410
Fno = 1.7, FFOV = 86.5 deg

| Element | Surface # | Radius (mm) | Thickness or separation (mm) | Refractive Index $N_d$ | Abbe Number $V_d$ |
|---|---|---|---|---|---|
| Object | 0 | Inf | Inf | | |
| L1 | *1 | 3.588 | 0.358 | 1.545 | 56.0 |
| | *2 | 8.847 | −0.060 | | |
| Stop | 3 | Inf | 0.120 | | |
| L2 | *4 | 11.245 | 0.507 | 1.545 | 56.0 |
| | *5 | −4.916 | 0.050 | | |
| L3 | *6 | 3.509 | 0.270 | 1.661 | 20.4 |
| | *7 | 2.301 | 0.424 | | |
| L4(ape) | *8 | −74.141 | 0.621 | 1.545 | 56.0 |
| | *9 | −3.772 | 0.226 | | |
| L5 | *10 | −1.558 | 0.300 | 1.661 | 20.4 |
| | *11 | −2.295 | 0.050 | | |
| L6 | *12 | 2.078 | 0.514 | 1.545 | 56.0 |
| | *13 | 2.960 | 0.384 | | |
| L7 | *14 | 1.506 | 0.532 | 1.545 | 56.0 |
| | *15 | 1.119 | 0.362 | | |
| Filter | 16 | Inf | 0.150 | 1.517 | 64.2 |
| | 17 | Inf | 0.650 | | |
| Sensor | 18 | Inf | 0 | | |

*Annotates aspheric surfaces (aspheric coefficients given in Tables 4B-4E)

TABLE 4B

Aspheric Coefficients (Lens System 410)

| | Surface (S#) | | | |
|---|---|---|---|---|
| | S1 | S2 | S4 | S5 |
| K | 0.00000E+00 | 0.00000E+00 | 0.00000E+00 | 0.00000E+00 |
| A4 | −6.87139E−02 | −1.41063E−01 | −5.76515E−02 | 1.11166E−02 |
| A6 | −2.65343E−03 | 5.47312E−03 | 5.10669E−03 | −2.54870E−02 |
| A8 | −4.15509E−02 | 5.35520E−02 | 7.87667E−02 | 4.34636E−03 |
| A10 | 3.10852E−02 | −3.69744E−02 | −6.66509E−02 | 1.58538E−03 |
| A12 | −6.08135E−03 | 8.63873E−03 | 2.07700E−02 | −3.04491E−03 |
| A14 | 0.00000E+00 | 0.00000E+00 | −3.50562E−03 | 4.45543E−05 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 4C

Aspheric Coefficients (Lens System 410)

| | Surface (S#) | | | |
|---|---|---|---|---|
| | S6 | S7 | S8 | S9 |
| K | 0.00000E+00 | 0.00000E+00 | 0.00000E+00 | 0.00000E+00 |
| A4 | −1.10115E−01 | −1.23015E−01 | −1.90886E−02 | −9.18985E−02 |
| A6 | 1.44245E−02 | 2.32806E−02 | −4.14665E−03 | 9.37935E−02 |
| A8 | −1.44747E−02 | −2.00680E−02 | −4.68787E−03 | −1.07030E−01 |
| A10 | 1.15125E−02 | 1.80039E−02 | −6.09420E−03 | 8.13471E−02 |
| A12 | −3.23143E−03 | −1.38860E−02 | 3.68790E−03 | −3.68387E−02 |
| A14 | −1.80795E−03 | 3.46148E−03 | 6.26946E−05 | 6.62134E−03 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 4D

Aspheric Coefficients (Lens System 410)

Surface (S#)

| | S10 | S11 | S12 | S13 |
|---|---|---|---|---|
| K | 0.00000E+00 | 0.00000E+00 | 0.00000E+00 | 0.00000E+00 |
| A4 | −1.06950E−01 | −1.16537E−01 | 1.51213E−02 | 1.04536E−01 |
| A6 | 4.08189E−01 | 1.99673E−01 | −1.11470E−01 | −1.22501E−01 |
| A8 | −5.87411E−01 | −2.22056E−01 | 7.74218E−02 | 5.20529E−02 |
| A10 | 5.22040E−01 | 1.65449E−01 | −4.36571E−02 | −1.32314E−02 |
| A12 | −2.61898E−01 | −6.96212E−02 | 1.62368E−02 | 1.96780E−03 |
| A14 | 6.65130E−02 | 1.47542E−02 | −3.48295E−03 | −1.52875E−04 |
| A16 | −6.47441E−03 | −1.14956E−03 | 3.14821E−04 | 4.62834E−06 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 4E

Aspheric Coefficients (Lens System 410)

Surface (S#)

| | S14 | S15 |
|---|---|---|
| K | −1.00000E+00 | −1.00000E+00 |
| A4 | −2.77492E−01 | −2.99036E−01 |
| A6 | 9.44416E−02 | 1.38233E−01 |
| A8 | −1.85059E−02 | −4.91065E−02 |
| A10 | 2.30288E−03 | 1.18103E−02 |
| A12 | −1.82048E−04 | −1.78576E−03 |
| A14 | 8.52448E−06 | 1.61024E−04 |
| A16 | −1.85072E−07 | −7.88048E−06 |
| A18 | 0.00000E+00 | 1.60650E−07 |
| A20 | 0.00000E+00 | 0.00000E+00 |

TABLE 4F

Optical Definitions (Lens system 410)

| | | | |
|---|---|---|---|
| f[mm] | 3.797 | Vd6 | 56.0 |
| Fno | 1.7 | fsys/f12 | 0.914 |
| FFOV[deg] | 86.5° | \|fsys/f3\| + \|fsys/f5\| | 0.782 |
| TTL/ImaH | 1.547 | (R9 + R10)/(R9 − R10) | −5.228 |
| (Vd1 + Vd3)/Vd2 | 1.36 | | |

TABLE 5A (Lens system 510)
Lens system 510
Fno = 1.75, FFOV = 76.0 deg

| Element | Surface # | Radius (mm) | Thickness or separation (mm) | Refractive Index $N_d$ | Abbe Number $V_d$ |
|---|---|---|---|---|---|
| Object | 0 | Inf | Inf | | |
| L1 | *1 | 2.799 | 0.515 | 1.678 | 55.3 |
| | *2 | 7.957 | 0.156 | | |
| Stop | 3 | Inf | −0.116 | | |
| L2 | *4 | 8.824 | 0.495 | 1.545 | 56.0 |
| | *5 | −38.936 | 0.061 | | |
| L3 | *6 | 4.785 | 0.300 | 1.671 | 19.5 |
| | *7 | 2.687 | 0.584 | | |
| L4 | *8 | 62.271 | 0.458 | 1.545 | 56.0 |
| | *9 | −6.395 | 0.300 | | |
| L5 | *10 | −1.624 | 0.330 | 1.671 | 19.5 |
| | *11 | −2.198 | 0.176 | | |
| L6 | *12 | 2.137 | 0.600 | 1.545 | 56.0 |
| | *13 | 2.921 | 0.630 | | |
| L7 | *14 | 3.564 | 0.574 | 1.545 | 56.0 |
| | *15 | 1.969 | 0.248 | | |
| Filter | 16 | Inf | 0.200 | 1.517 | 64.2 |
| | 17 | Inf | 0.589 | | |
| Sensor | 18 | Inf | 0.000 | | |

*Annotates aspheric surfaces (aspheric coefficients given in Tables 5B-5E)

TABLE 5B

Aspheric Coefficients (Lens System 510)

Surface (S#)

| | S1 | S2 | S4 | S5 |
|---|---|---|---|---|
| K | 0.00000E+00 | 0.00000E+00 | 0.00000E+00 | 0.00000E+00 |
| A4 | −2.87841E−02 | −7.74463E−02 | −3.22850E−02 | 1.70938E−02 |
| A6 | 1.20615E−02 | 1.28363E−02 | −1.60390E−02 | −1.63784E−02 |
| A8 | −2.44465E−02 | 2.36840E−02 | 7.76458E−02 | −5.57964E−03 |
| A10 | 1.18127E−02 | −1.49048E−02 | −5.07699E−02 | 4.23043E−03 |
| A12 | −1.63924E−03 | 3.22003E−03 | 1.27979E−02 | −7.34848E−04 |
| A14 | 0.00000E+00 | 0.00000E+00 | −9.98944E−04 | 8.74525E−05 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 5C

Aspheric Coefficients (Lens System 510)

| | Surface (S#) | | | |
|---|---|---|---|---|
| | S6 | S7 | S8 | S9 |
| K | 0.00000E+00 | 0.00000E+00 | 0.00000E+00 | 0.00000E+00 |
| A4 | −6.96462E−02 | −8.41529E−02 | −3.88860E−02 | −4.47361E−02 |
| A6 | 3.00360E−02 | 5.68837E−02 | −1.27338E−02 | 4.72656E−02 |
| A8 | −1.11213E−02 | −3.42487E−02 | 3.64131E−03 | −6.94547E−02 |
| A10 | 3.85523E−03 | 2.10999E−02 | −6.00617E−03 | 5.11704E−02 |
| A12 | 1.27146E−03 | −7.07483E−03 | 1.75852E−03 | −1.93692E−02 |
| A14 | −5.84598E−04 | 1.16314E−03 | 5.65390E−04 | 2.99051E−03 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 5D

Aspheric Coefficients (Lens System 510)

| | Surface (S#) | | | |
|---|---|---|---|---|
| | S10 | S11 | S12 | S13 |
| K | 0.00000E+00 | 0.00000E+00 | −1.00000E+00 | 0.00000E+00 |
| A4 | 9.00794E−02 | 1.17886E−02 | −7.23946E−02 | −1.61905E−02 |
| A6 | −5.06815E−04 | −3.59261E−03 | 1.63035E−02 | −1.44504E−02 |
| A8 | −3.69265E−02 | 1.23897E−02 | −8.32292E−03 | 4.93190E−03 |
| A10 | 5.39105E−02 | −9.22268E−03 | 2.27821E−03 | −1.05531E−03 |
| A12 | −2.94572E−02 | 5.53239E−03 | −3.35075E−04 | 1.38287E−04 |
| A14 | 7.41675E−03 | −1.76962E−03 | 3.00073E−05 | −9.09815E−06 |
| A16 | −7.16588E−04 | 2.10520E−04 | −1.28586E−06 | 1.96984E−07 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 5E

Aspheric Coefficients (Lens System 510)

| | Surface (S#) | |
|---|---|---|
| | S14 | S15 |
| K | −1.00000E+00 | −1.00000E+00 |
| A4 | −1.37976E−01 | −1.47241E−01 |
| A6 | 4.28089E−02 | 5.31172E−02 |
| A8 | −8.45973E−03 | −1.60379E−02 |
| A10 | 1.15443E−03 | 3.35399E−03 |
| A12 | −1.00644E−04 | −4.40049E−04 |
| A14 | 4.94238E−06 | 3.42149E−05 |
| A16 | −1.03363E−07 | −1.43279E−06 |
| A18 | 0.00000E+00 | 2.47956E−08 |
| A20 | 0.00000E+00 | 0.00000E+00 |

TABLE 5F

Optical Definitions (Lens system 510)

| f[mm] | 4.889 | Vd6 | 56.0 |
|---|---|---|---|
| Fno | 1.75 | fsys/f12 | 1.138 |
| FFOV[deg] | 75.0° | \|fsys/f3\| + \|fsys/f5\| | 0.918 |
| TTL/ImaH | 1.594 | (R9 + R10)/(R9 − R10) | −6.659 |
| (Vd1 + Vd3)/Vd2 | 1.34 | | |

TABLE 6A (Lens system 610)
Lens system 610
Fno = 1.79, FFOV = 93.8 deg

| Element | Surface # | Radius (mm) | Thickness or separation (mm) | Refractive Index $N_d$ | Abbe Number $V_d$ |
|---|---|---|---|---|---|
| Object | 0 | Inf | Inf | | |
| L1 | *1 | 9.893 | 0.301 | 1.545 | 56.0 |
| | *2 | −20.150 | −0.072 | | |
| Stop | 3 | Inf | 0.156 | | |
| L2 | *4 | −15.153 | 0.470 | 1.545 | 56.0 |
| | *5 | −2.755 | 0.050 | | |
| L3 | *6 | 2.749 | 0.282 | 1.671 | 19.5 |
| | *7 | 2.008 | 0.367 | | |
| L4(ape) | *8 | −12.915 | 0.826 | 1.545 | 56.0 |
| | *9 | −3.410 | 0.169 | | |
| L5 | *10 | −1.554 | 0.361 | 1.671 | 19.5 |
| | *11 | −2.702 | 0.050 | | |
| L6 | *12 | 2.178 | 0.566 | 1.545 | 56.0 |
| | *13 | 7.664 | 0.258 | | |
| L7 | *14 | 1.112 | 0.439 | 1.545 | 56.0 |
| | *15 | 0.881 | 0.500 | | |
| Filter | 16 | Inf | 0.150 | 1.517 | 64.2 |
| | 17 | Inf | 0.650 | | |
| Sensor | 18 | Inf | 0.000 | | |

*Annotates aspheric surfaces (aspheric coefficients given in Tables 6B-6E)

TABLE 6B

Aspheric Coefficients (Lens System 610)

| | Surface (S#) | | | |
|---|---|---|---|---|
| | S1 | S2 | S4 | S5 |
| K | 0.00000E+00 | 0.00000E+00 | 0.00000E+00 | 0.00000E+00 |
| A4 | −8.54874E−02 | −1.29422E−01 | −4.96919E−02 | −4.97829E−03 |
| A6 | −2.92135E−03 | 1.65093E−02 | −8.55566E−03 | −2.87222E−02 |
| A8 | −3.23911E−02 | 4.88389E−02 | 8.24493E−02 | 1.54703E−02 |
| A10 | 3.41242E−02 | −4.11291E−02 | −7.80300E−02 | −8.82930E−03 |
| A12 | −8.18398E−03 | 1.35679E−02 | 2.26991E−02 | −3.46007E−03 |
| A14 | 0.00000E+00 | 0.00000E+00 | −4.86829E−03 | −7.69854E−04 |
| A16 | 0.00000E+00 | 0.00000E+00 | 7.04683E−13 | 5.55645E−04 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 6C

Aspheric Coefficients (Lens System 610)

| | Surface (S#) | | | |
|---|---|---|---|---|
| | S6 | S7 | S8 | S9 |
| K | 0.00000E+00 | 0.00000E+00 | 0.00000E+00 | 0.00000E+00 |
| A4 | −1.20944E−01 | −1.37693E−01 | −2.23939E−02 | −1.39867E−01 |
| A6 | 1.37811E−02 | 2.44784E−02 | −5.54065E−03 | 1.03517E−01 |
| A8 | −1.82004E−02 | −2.74661E−02 | −9.66051E−03 | −1.05067E−01 |
| A10 | 1.08938E−02 | 1.73582E−02 | −4.75993E−03 | 8.15255E−02 |
| A12 | −5.61416E−03 | −1.19012E−02 | 4.47867E−03 | −3.68732E−02 |
| A14 | −1.54022E−03 | 3.80138E−03 | 3.70650E−04 | 6.51606E−03 |
| A16 | −2.90552E−04 | 1.19506E−05 | 1.01270E−05 | 1.93153E−05 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 6D

Aspheric Coefficients (Lens System 610)

| | Surface (S#) | | | |
|---|---|---|---|---|
| | S10 | S11 | S12 | S13 |
| K | 0.00000E+00 | 0.00000E+00 | 0.00000E+00 | 0.00000E+00 |
| A4 | −1.24230E−01 | −1.66946E−01 | 3.91676E−02 | 2.42652E−01 |
| A6 | 3.34553E−01 | 2.03674E−01 | −1.15821E−01 | −2.28507E−01 |
| A8 | −3.48613E−01 | −1.36071E−01 | 1.06102E−01 | 1.15685E−01 |
| A10 | 2.55101E−01 | 6.36438E−02 | −8.87040E−02 | −4.03913E−02 |
| A12 | −1.06193E−01 | −1.58712E−02 | 5.43856E−02 | 9.83342E−03 |
| A14 | 1.99169E−02 | 9.73536E−04 | −2.22572E−02 | −1.64155E−03 |
| A16 | −6.87339E−04 | 2.05965E−04 | 5.69580E−03 | 1.80004E−04 |
| A18 | 0.00000E+00 | 0.00000E+00 | −8.23279E−04 | −1.16281E−05 |
| A20 | 0.00000E+00 | 0.00000E+00 | 5.10427E−05 | 3.30815E−07 |

TABLE 6E

Aspheric Coefficients (Lens System 610)

| | Surface (S#) | |
|---|---|---|
| | S14 | S15 |
| K | −1.00000E+00 | −1.00000E+00 |
| A4 | −2.35121E−01 | −3.16279E−01 |
| A6 | 3.70422E−02 | 1.25385E−01 |
| A8 | 5.00077E−03 | −3.94052E−02 |
| A10 | −5.02644E−03 | 8.58115E−03 |
| A12 | 1.73785E−03 | −1.13335E−03 |

TABLE 6E-continued

Aspheric Coefficients (Lens System 610)

| | Surface (S#) | |
|---|---|---|
| | S14 | S15 |
| A14 | −3.40303E−04 | 7.46468E−05 |
| A16 | 3.81534E−05 | −4.81599E−07 |
| A18 | −2.27502E−06 | −2.09744E−07 |
| A20 | 5.59302E−08 | 8.12967E−09 |

TABLE 6F

Optical Definitions (Lens system 610)

| | | | |
|---|---|---|---|
| f[mm] | 3.401 | Vd6 | 56.0 |
| Fno | 1.79 | fsys/f12 | 0.811 |
| FFOV[deg] | 93.8° | \|fsys/f3\| + \|fsys/f5\| | 0.812 |
| TTL/ImaH | 1.534 | (R9 + R10)/(R9 − R10) | −3.707 |
| (Vd1 + Vd3)/Vd2 | 1.35 | | |

TABLE 7A (Lens system 710)
Lens system 710
Fno = 1.65, FFOV = 80.3 deg

| Element | Surface # | Radius (mm) | Thickness or separation (mm) | Refractive Index $N_d$ | Abbe Number $V_d$ |
|---|---|---|---|---|---|
| Object | 0 | Inf | Inf | | |
| L1 | *1 | 3.368 | 0.454 | 1.678 | 55.3 |
| | *2 | 26.231 | 0.085 | | |

TABLE 7A-continued (Lens system 710)
Lens system 710
Fno = 1.65, FFOV = 80.3 deg

| Element | Surface # | Radius (mm) | Thickness or separation (mm) | Refractive Index $N_d$ | Abbe Number $V_d$ |
|---|---|---|---|---|---|
| Stop | 3 | Inf | −0.035 | | |
| L2 | *4 | 68.151 | 0.447 | 1.545 | 56.0 |
| | *5 | −15.443 | 0.065 | | |
| L3 | *6 | 3.535 | 0.270 | 1.671 | 19.5 |
| | *7 | 2.478 | 0.557 | | |
| L4 | *8 | −194.992 | 0.603 | 1.545 | 56.0 |
| | *9 | −6.045 | 0.231 | | |
| L5 | *10 | −1.641 | 0.359 | 1.671 | 19.5 |
| | *11 | −2.568 | 0.059 | | |
| L6 | *12 | 2.214 | 0.679 | 1.545 | 56.0 |
| | *13 | 4.192 | 0.450 | | |
| L7 | *14 | 1.948 | 0.650 | 1.545 | 56.0 |
| | *15 | 1.416 | 0.394 | | |
| Filter | 16 | Inf | 0.150 | 1.517 | 64.2 |
| | 17 | Inf | 0.581 | | |
| Sensor | 18 | Inf | 0.000 | | |

*Annotates aspheric surfaces (aspheric coefficients given in Tables 7B-7E)

TABLE 7B

Aspheric Coefficients (Lens System 710)

| | Surface (S#) | | | |
|---|---|---|---|---|
| | S1 | S2 | S4 | S5 |
| K | 0.00000E+00 | 0.00000E+00 | 0.00000E+00 | 0.00000E+00 |
| A4 | −3.44743E−02 | −6.27155E−02 | −1.11696E−02 | 9.28600E−03 |
| A6 | 6.74888E−03 | −5.09915E−03 | −2.28545E−02 | −9.71708E−03 |
| A8 | −2.96218E−02 | 2.72039E−02 | 7.69463E−02 | −9.62688E−03 |
| A10 | 1.55924E−02 | −1.52393E−02 | −5.26124E−02 | 5.24733E−03 |
| A12 | −2.21316E−03 | 3.28068E−03 | 1.40864E−02 | −9.15930E−04 |
| A14 | 0.00000E+00 | 0.00000E+00 | −1.09968E−03 | 2.48834E−04 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 7C

Aspheric Coefficients (Lens System 710)

| | Surface (S#) | | | |
|---|---|---|---|---|
| | S6 | S7 | S8 | S9 |
| K | 0.00000E+00 | 0.00000E+00 | 0.00000E+00 | 0.00000E+00 |
| A4 | −7.32015E−02 | −8.04783E−02 | −3.26817E−02 | −7.74378E−02 |
| A6 | 2.60355E−02 | 4.62935E−02 | −6.23032E−03 | 6.26289E−02 |
| A8 | −1.44950E−02 | −3.49531E−02 | 2.17401E−03 | −6.82425E−02 |
| A10 | 5.26982E−03 | 2.27973E−02 | −4.85828E−03 | 4.92366E−02 |
| A12 | 1.39273E−03 | −7.83022E−03 | 1.71949E−03 | −1.83752E−02 |
| A14 | −6.60225E−04 | 1.17663E−03 | 2.96148E−04 | 2.63725E−03 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 7D

Aspheric Coefficients (Lens System 710)

| | Surface (S#) | | | |
|---|---|---|---|---|
| | S10 | S11 | S12 | S13 |
| K | 0.00000E+00 | 0.00000E+00 | −1.00000E+00 | 0.00000E+00 |
| A4 | 4.05724E−02 | −3.86026E−02 | −6.18155E−02 | 1.02626E−02 |
| A6 | 3.09326E−04 | 2.05060E−02 | 3.38178E−02 | −1.73677E−03 |
| A8 | 3.80031E−02 | 2.28231E−02 | −1.91914E−02 | −4.53206E−03 |
| A10 | −3.48428E−02 | −2.75874E−02 | 5.51249E−03 | 1.73567E−03 |
| A12 | 1.94087E−02 | 1.36669E−02 | −8.64167E−04 | −2.91549E−04 |
| A14 | −6.10262E−03 | −3.27438E−03 | 6.82043E−05 | 2.41326E−05 |
| A16 | 7.94906E−04 | 3.04947E−04 | −2.05288E−06 | −7.96272E−07 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 7E

Aspheric Coefficients (Lens System 710)

| | Surface (S#) | |
|---|---|---|
| | S14 | S15 |
| K | −1.00000E+00 | −1.00000E+00 |
| A4 | −1.72955E−01 | −1.72321E−01 |
| A6 | 5.19549E−02 | 6.08467E−02 |
| A8 | −1.06579E−02 | −1.69687E−02 |
| A10 | 1.52322E−03 | 3.18908E−03 |
| A12 | −1.36015E−04 | −3.87618E−04 |
| A14 | 6.61824E−06 | 2.95229E−05 |
| A16 | −1.32761E−07 | −1.28364E−06 |
| A18 | 0.00000E+00 | 2.41956E−08 |
| A20 | 0.00000E+00 | 0.00000E+00 |

TABLE 7F

Optical Definitions (Lens system 710)

| | | | |
|---|---|---|---|
| f[mm] | 4.361 | Vd6 | 56.0 |
| Fno | 1.65 | fsys/f12 | 0.943 |
| FFOV[deg] | 80.3° | \|fsys/f3\| + \|fsys/f5\| | 0.868 |
| TTL/ImaH | 1.600 | (R9 + R10)/(R9 − R10) | −4.540 |
| (Vd1 + Vd3)/Vd2 | 1.34 | | |

TABLE 8A (Lens system 810)
Lens system 810
Fno = 1.85, FFOV = 79.7 deg

| Element | Surface # | Radius (mm) | Thickness or separation (mm) | Refractive Index $N_d$ | Abbe Number $V_d$ |
|---|---|---|---|---|---|
| Object | 0 | Inf | Inf | | |
| Stop | 1 | Inf | −0.094 | | |
| L1 | *2 | 3.205 | 0.466 | 1.678 | 55.3 |
| | *3 | 19.147 | 0.050 | | |
| L2 | *4 | 29.478 | 0.603 | 1.545 | 56.0 |
| | *5 | −15.167 | 0.064 | | |
| L3 | *6 | 4.972 | 0.270 | 1.671 | 19.5 |
| | *7 | 2.959 | 0.486 | | |
| L4 | *8 | 40.884 | 0.486 | 1.545 | 56.0 |
| | *9 | −7.986 | 0.257 | | |
| L5 | *10 | −1.646 | 0.337 | 1.671 | 19.5 |
| | *11 | −2.375 | 0.095 | | |
| L6 | *12 | 2.131 | 0.635 | 1.545 | 56.0 |
| | *13 | 4.027 | 0.383 | | |
| L7 | *14 | 2.887 | 0.747 | 1.545 | 56.0 |
| | *15 | 1.697 | 0.319 | | |
| Filter | 16 | Inf | 0.200 | 1.517 | 64.2 |
| | 17 | Inf | 0.600 | | |
| Sensor | 18 | Inf | 0.000 | | |

*Annotates aspheric surfaces (aspheric coefficients given in Tables 8B-8E)

TABLE 8B

Aspheric Coefficients (Lens System 810)

| | Surface (S#) | | | |
|---|---|---|---|---|
| | S2 | S3 | S4 | S5 |
| K | 0.00000E+00 | 0.00000E+00 | 0.00000E+00 | 0.00000E+00 |
| A4 | −3.33453E−02 | −6.59874E−02 | −1.39071E−02 | 1.77924E−02 |
| A6 | 2.21206E−03 | −6.54625E−04 | −7.27079E−03 | −1.05580E−02 |
| A8 | −2.87575E−02 | 2.59976E−02 | 7.34537E−02 | −8.42516E−03 |
| A10 | 1.64859E−02 | −1.59665E−02 | −5.23493E−02 | 4.91074E−03 |
| A12 | −2.75046E−03 | 3.12712E−03 | 1.39528E−02 | −1.02281E−03 |
| A14 | 0.00000E+00 | 0.00000E+00 | −1.25200E−03 | 1.94067E−04 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 8C

Aspheric Coefficients (Lens System 810)

| | Surface (S#) | | | |
|---|---|---|---|---|
| | S6 | S7 | S8 | S9 |
| K | 0.00000E+00 | 0.00000E+00 | 0.00000E+00 | 0.00000E+00 |
| A4 | −6.51317E−02 | −7.50044E−02 | −3.88245E−02 | −7.80156E−02 |
| A6 | 1.21691E−02 | 3.71948E−02 | 3.05634E−03 | 6.19215E−02 |
| A8 | −1.26592E−02 | −3.26568E−02 | −2.36015E−03 | −6.76501E−02 |
| A10 | 5.00387E−03 | 2.21537E−02 | −4.55367E−03 | 4.93059E−02 |
| A12 | 1.51365E−03 | −7.80729E−03 | 1.59262E−03 | −1.83492E−02 |
| A14 | −5.56235E−04 | 1.20591E−03 | 2.33908E−04 | 2.65054E−03 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 8D

Aspheric Coefficients (Lens System 810)

| | Surface (S#) | | | |
|---|---|---|---|---|
| | S10 | S11 | S12 | S13 |
| K | 0.00000E+00 | 0.00000E+00 | −1.00000E+00 | 0.00000E+00 |
| A4 | 4.59427E−02 | −1.39717E−02 | −3.91461E−02 | 4.51843E−02 |
| A6 | 4.33340E−02 | 4.25585E−03 | −7.45644E−03 | −5.12982E−02 |
| A8 | −6.56422E−02 | 2.10136E−02 | 4.00291E−03 | 1.95552E−02 |
| A10 | 7.27541E−02 | −1.57416E−02 | −1.53258E−03 | −4.87089E−03 |
| A12 | −3.72528E−02 | 6.98548E−03 | 3.02585E−04 | 7.40813E−04 |
| A14 | 8.88956E−03 | −1.80096E−03 | −2.94270E−05 | −5.97926E−05 |
| A16 | −8.01808E−04 | 1.90153E−04 | 1.24868E−06 | 1.93110E−06 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 8E

Aspheric Coefficients (Lens System 810)

| | Surface (S#) | |
|---|---|---|
| | S14 | S15 |
| K | −1.00000E+00 | −1.00000E+00 |
| A4 | −1.33823E−01 | −1.44219E−01 |
| A6 | 3.52857E−02 | 5.07328E−02 |
| A8 | −6.17338E−03 | −1.49682E−02 |
| A10 | 8.75308E−04 | 3.19899E−03 |
| A12 | −8.79522E−05 | −4.40498E−04 |
| A14 | 4.94928E−06 | 3.63818E−05 |
| A16 | −1.12493E−07 | −1.63487E−06 |
| A18 | 0.00000E+00 | 3.06948E−08 |
| A20 | 0.00000E+00 | 0.00000E+00 |

TABLE 8F

Optical Definitions (Lens system 810)

| f[mm] | 4.431 | Vd6 | 56.0 |
|---|---|---|---|
| Fno | 1.85 | fsys/f12 | 1.005 |
| FFOV[deg] | 79.7° | |fsys/f3| + |fsys/f5| | 0.844 |
| TTL/ImaH | 1.599 | (R9 + R10)/(R9 − R10) | −5.516 |
| (Vd1 + Vd3)/Vd2 | 1.34 | | |

Example Computing Device

Figure 10:
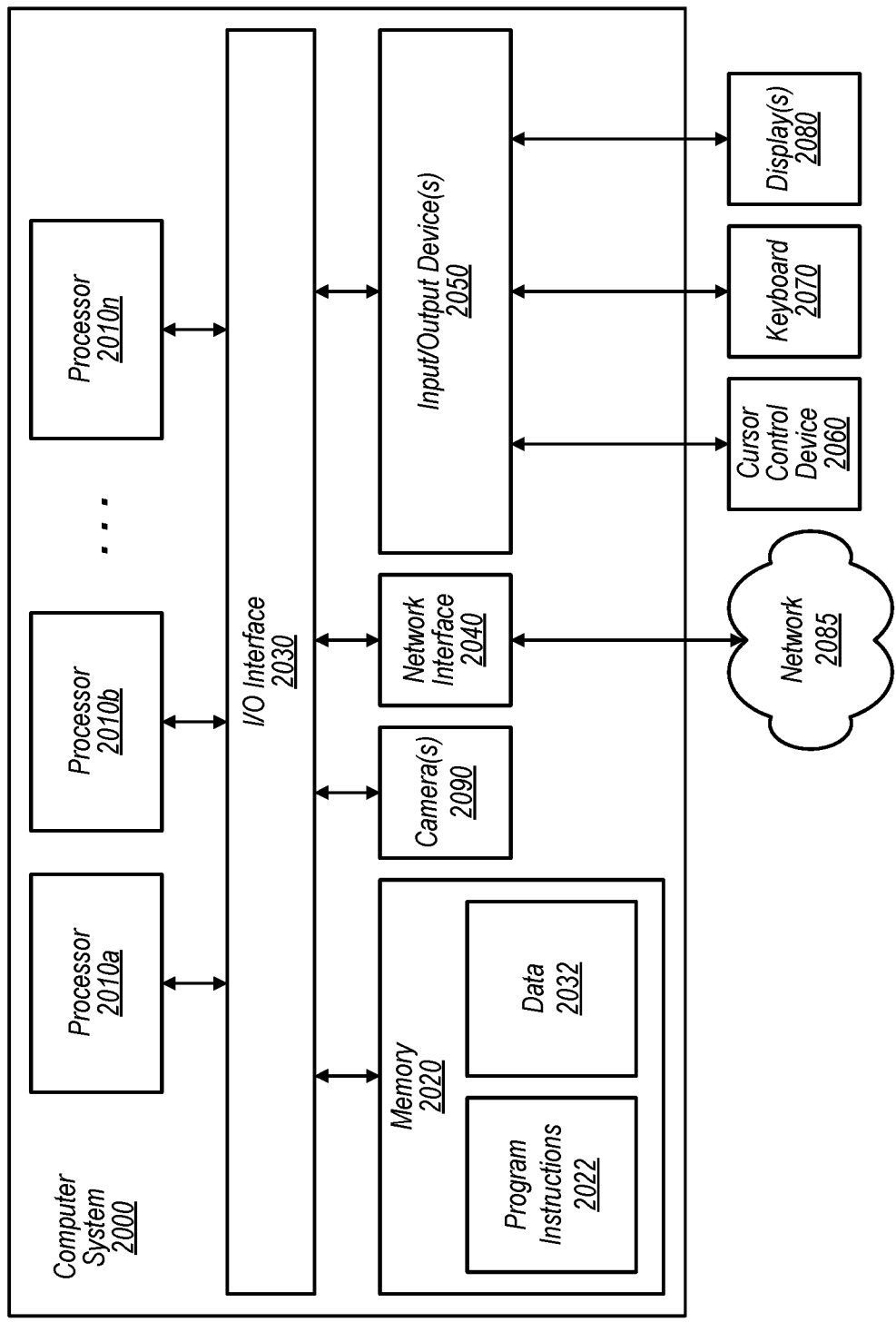
FIG. 10 illustrates an example computer system that may be used in embodiments.

FIG. 10 illustrates an example computing device, referred to as computer system 2000, that may include or host embodiments of a camera with a lens system as illustrated in FIGS. 1A through 9. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more cameras as described above with respect to FIGS. 1A through 9, which may also be coupled to I/O interface 2030, or one or more cameras as described above with respect to FIGS. 1A through 9 along with one or more other cameras such as conventional wide-field cameras.

In various embodiments, computer system 2000 may be a uniprocessor system including one processor 2010, or a multiprocessor system including several processors 2010

(e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 10, memory 2020 may include program instructions 2022, which may be processor-executable to implement any element or action to support integrated camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A lens system, comprising:
a plurality of refractive lens elements arranged along an optical axis of the lens system, wherein the plurality of lens elements includes, in order along the optical axis from an object side to an image side:
  a first lens element with positive refractive power;
  a second lens element with refractive power;
  a third lens element with negative refractive power;
  a fourth lens element with positive refractive power;
  a fifth lens element with refractive power;
  a sixth lens element with positive refractive power; and
  a seventh lens element with refractive power;
wherein Abbe number of the sixth lens element (Vd6) satisfies Vd6>45;
wherein the lens system satisfies the relationship:

TTL/ImageH<1.7, where TTL is total track length of the lens system, and ImageH is semi-diagonal image height at an image plane of the lens system;
wherein the second lens element has an Abbe number higher than respective Abbe numbers for the third and fifth lens elements;
wherein the lens system satisfies the relationship:

(R9+R10)/(R9−R10)<−2, where R9 is radius of curvature of an object side surface of the fifth lens element and R10 is radius of curvature of an image side surface of the fifth lens element; and
wherein an F-number of the lens system is within a range of 1.6 to 1.85.

2. The lens system as recited in claim 1, wherein the lens system satisfies the relationship:

0.6<($f_{system}$/f12)<1.4, where $f_{system}$ is effective focal length of the lens system and f12 is composite focal length of the first and second lens elements.

3. The lens system as recited in claim 1, wherein the lens system satisfies the relationship:

0.55<|$f_{system}$/f3|+|$f_{system}$/f5|<1.15, where $f_{system}$ is effective focal length of the lens system, f3 is effective focal length of the third lens element, and f5 is effective focal length of the fifth lens element.

4. The lens system as recited in claim 1, wherein the lens system satisfies the relationship:

0.8<(Vd1+Vd3)/Vd2<3, where Vd1, Vd2, and Vd3 are Abbe numbers of the first, second, and third lens elements, respectively.

5. The lens system as recited in claim 1, wherein the third lens element has a concave image-side surface in a paraxial region.

6. The lens system as recited in claim 1, wherein the fifth lens element has a concave object-side surface and a convex image-side surface.

7. The lens system as recited in claim 1, wherein an object-side surface and an image-side surface of the sixth lens element are aspheric, wherein the sixth lens element has a convex object-side surface in a paraxial region, and wherein the object side surface of the sixth lens element has at least one part being concave in a peripheral region.

8. The lens system as recited in claim 1, wherein an object-side surface and an image-side surface of the seventh lens element are aspheric, wherein the seventh lens element has a concave image-side surface in a paraxial region, wherein the object-side surface of the seventh lens element has at least one part being concave in a peripheral region, and wherein the image-side surface of the seventh lens element has at least one part being convex in a peripheral region.

9. The lens system as recited in claim 1, wherein the lens system further includes an aperture stop located between a front vertex of the lens system and the second lens element.

10. The lens system as recited in claim 9, wherein the lens system further includes at least one secondary stop located between the first lens element and the fifth lens element.

11. The lens system as recited in claim 1, wherein effective focal length f of the lens system is within a range of 3.4 to 5 mm, and full field of view of the lens system is within a range of 75 to 94 degrees.

12. The lens system as recited in claim 1, wherein TTL of the lens system is less than 6.8 mm.

13. A camera, comprising:
a photosensor configured to capture light projected onto a surface of the photosensor; and
a lens system configured to refract light from an object field located in front of the camera to form an image of a scene at an image plane at or near the surface of the photosensor, wherein the lens system includes seven refractive lens elements arranged in order along an optical axis from a first lens element having a positive refractive power on an object side of the camera to a seventh lens element on an image side of the camera, including a fourth lens with positive refractive power and a sixth lens element with positive refractive power;
wherein the lens system satisfies the relationship:

TTL/ImageH<1.7, where TTL is total track length of the lens system, and ImageH is semi-diagonal image height at the image plane; and
wherein a second lens element in order along the optical axis has an Abbe number higher than respective Abbe numbers for a third lens element and a fifth lens element in order along the optical axis;
wherein Abbe number of the sixth lens (Vd6) satisfies Vd6>45;

wherein the lens system satisfies the relationship:

$(R9+R10)/(R9-R10)<-2,$ where R9 is radius of curvature of an object side surface of the fifth lens element and R10 is radius of curvature of an image side surface of the fifth lens element; and
wherein an F-number of the lens system is within a range of 1.6 to 1.85.

14. The camera as recited in claim 13, wherein the lens system satisfies one or more of the relationships:

$0.6<(f_{system}/f12)<1.4,$ $0.55<|f_{system}/f3|+|f_{system}/f5|<1.15,$ $(R9+R10)/(R9-R10)<-2,$ $0.8<(Vd1+Vd3)/Vd2<3,$ where $f_{system}$ is effective focal length of the lens system, f12 is composite focal length of the first and second lens elements, f3 is effective focal length of the third lens element, f5 is effective focal length of the fifth lens element, R9 is radius of curvature of an object side surface of the fifth lens element, R10 is radius of curvature of an image side surface of the fifth lens element, and Vd1, Vd2, and Vd3 are Abbe numbers of the first, second, and third lens elements, respectively.

15. The camera as recited in claim 13, wherein effective focal length f of the lens system is within a range of 3.4 to 5 mm, and full field of view of the lens system is within a range of 75 to 94 degrees.

16. The camera as recited in claim 13, wherein TTL of the lens system is less than 6.8 mm.

17. A device, comprising:
one or more processors;
one or more cameras; and
a memory comprising program instructions executable by at least one of the one or more processors to control operations of the one or more cameras;
wherein at least one of the one or more cameras is a camera comprising:
a photosensor configured to capture light projected onto a surface of the photosensor; and
a lens system configured to refract light from an object field located in front of the camera to form an image of a scene at an image plane at or near the surface of the photosensor, wherein the lens system includes seven refractive lens elements arranged in order along an optical axis from a first lens element having a positive refractive power on an object side of the camera to a seventh lens element on an image side of the camera, including a fourth lens with positive refractive power and a sixth lens element with positive refractive power;
wherein the lens system satisfies the relationship:

$TTL/ImageH<1.7,$ where TTL is total track length of the lens system, and ImageH is semi-diagonal image height at the image plane;
wherein a second lens element in order along the optical axis has an Abbe number higher than respective Abbe numbers for a third lens element and a fifth lens element in order along the optical axis;
wherein Abbe number of the sixth lens element (Vd6) satisfies Vd6>45;
wherein the lens system satisfies the relationship:

$(R9+R10)/(R9-R10)<-2,$ where R9 is radius of curvature of an object side surface of the fifth lens element and R10 is radius of curvature of an image side surface of the fifth lens element; and
wherein an F-number of the lens system is within a range of 1.6 to 1.85.

18. The device as recited in claim 17, wherein effective focal length f of the lens system is within a range of 3.4 to 5 mm, full field of view of the lens system is within a range of 75 to 94 degrees, and TTL of the lens system is less than 6.8 mm.

* * * * *